United States Patent
Tairbekov

(10) Patent No.: US 12,482,272 B2
(45) Date of Patent: Nov. 25, 2025

(54) PSEUDO-RANDOM SEQUENCES FOR SELF-SUPERVISED LEARNING OF TRAFFIC SCENES

(71) Applicant: GM Cruise Holdings LLC, San Francisco, CA (US)

(72) Inventor: Chingiz Tairbekov, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 539 days.

(21) Appl. No.: 18/093,479

(22) Filed: Jan. 5, 2023

(65) Prior Publication Data
US 2024/0233393 A1 Jul. 11, 2024

(51) Int. Cl.
*G06V 10/82* (2022.01)
*G06V 10/778* (2022.01)
*G06V 20/56* (2022.01)
*G06V 20/58* (2022.01)
*G06V 20/70* (2022.01)

(52) U.S. Cl.
CPC ............ *G06V 20/58* (2022.01); *G06V 10/778* (2022.01); *G06V 10/82* (2022.01); *G06V 20/588* (2022.01); *G06V 20/70* (2022.01)

(58) Field of Classification Search
CPC ...... G06V 20/58; G06V 20/588; G06V 20/70; G06V 20/56; G06V 10/778; G06V 10/82
See application file for complete search history.

(56) References Cited

U.S. PATENT DOCUMENTS

| | | | | |
|---|---|---|---|---|
| 9,081,385 | B1* | 7/2015 | Ferguson | G05D 1/0246 |
| 11,409,304 | B1* | 8/2022 | Cai | B60R 1/00 |
| 2017/0369016 | A1* | 12/2017 | Gurghian | B60W 30/0956 |
| 2019/0147610 | A1* | 5/2019 | Frossard | G06N 3/045 |
| | | | | 382/103 |
| 2020/0097742 | A1* | 3/2020 | Ratnesh Kumar | G06N 3/047 |
| 2020/0103909 | A1* | 4/2020 | Feinson | G05D 1/0238 |
| 2022/0024485 | A1* | 1/2022 | Theverapperuma | G06V 20/58 |
| 2022/0138910 | A1* | 5/2022 | Serra Lleti | G06T 7/11 |
| | | | | 382/157 |
| 2023/0067528 | A1* | 3/2023 | Guo | G06N 3/0895 |

* cited by examiner

*Primary Examiner* — Carol W Chan
(74) *Attorney, Agent, or Firm* — CANTOR COLBURN LLP

(57) ABSTRACT

Systems and techniques are provided for generating self-supervised neural networks and using pseudo-random sequences of traffic scenes for self-supervised training. An example method can include obtaining sensor data collected for a scene associated with an autonomous vehicle (AV), the sensor data describing, measuring, or depicting one or more elements in the scene; generating one or more sets of numerical representations of the sensor data, wherein each numerical representation of the one or more sets of numerical representations represents at least one element of the one or more elements; and determine, via a neural network, a semantic meaning of at least one numerical representation from the one or more sets of numerical representations of the sensor data, the at least one numerical representation corresponding to the at least one element of the one or more elements.

18 Claims, 11 Drawing Sheets

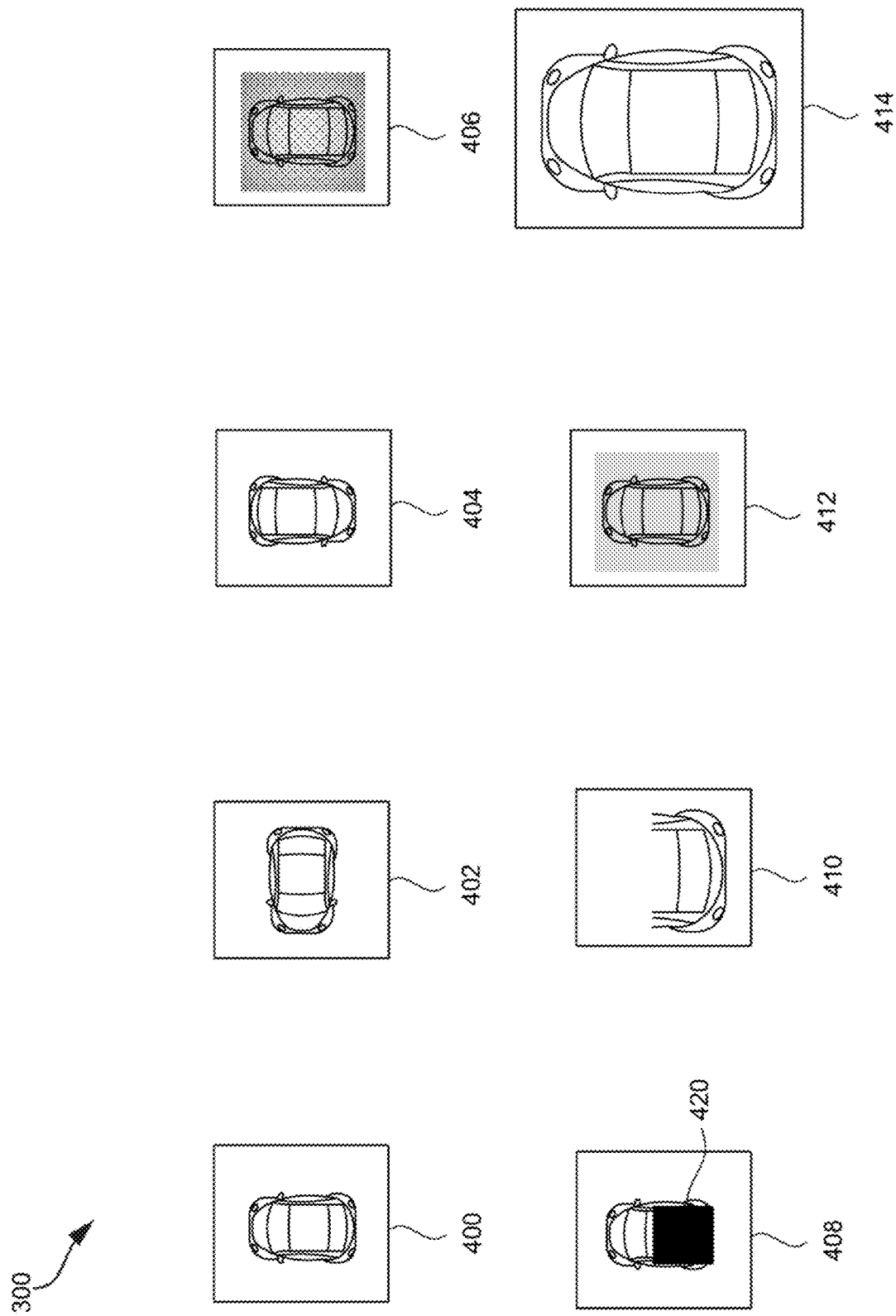

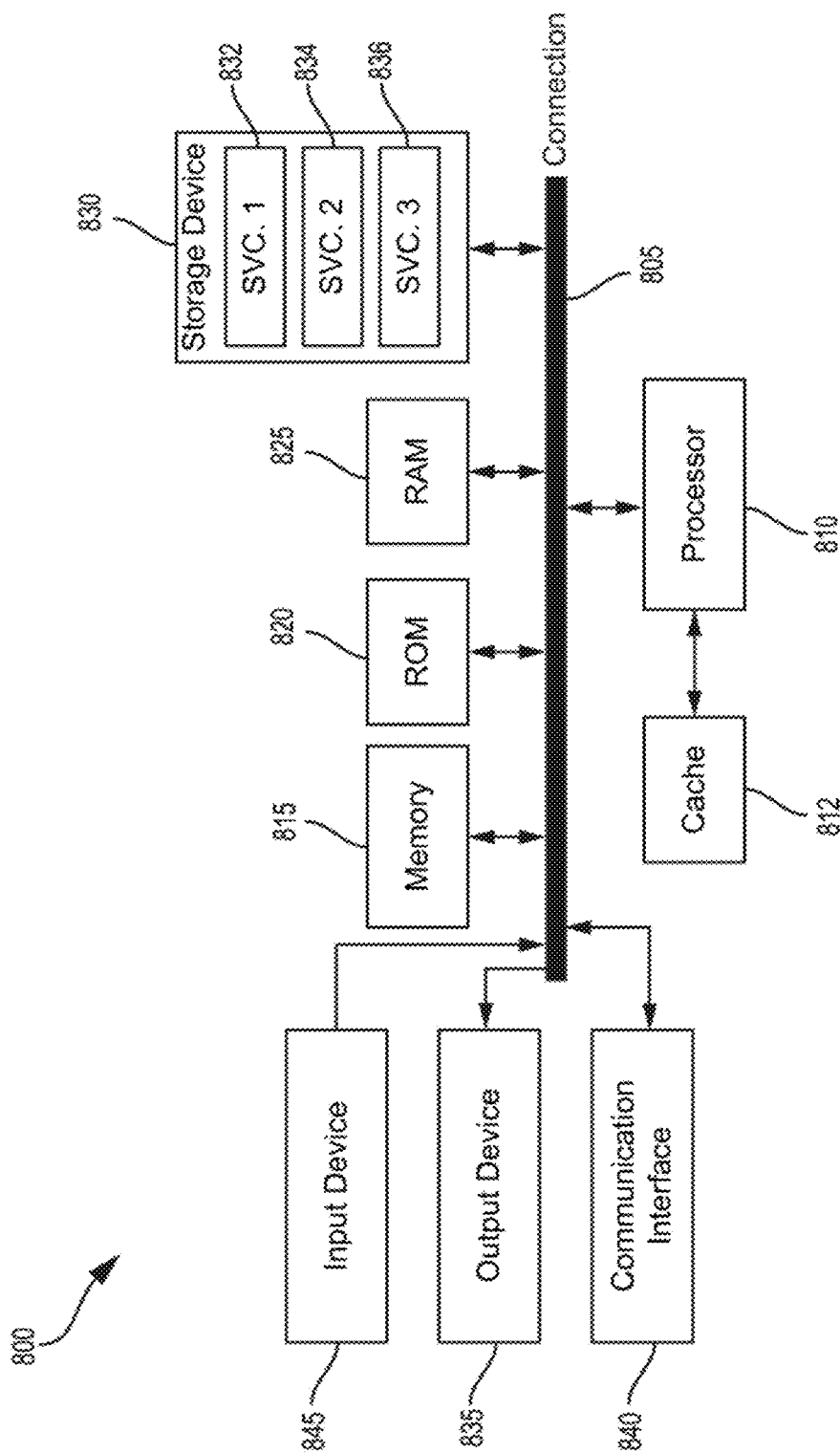

ates, 272 B2

PSEUDO-RANDOM SEQUENCES FOR SELF-SUPERVISED LEARNING OF TRAFFIC SCENES

TECHNICAL FIELD

The present disclosure generally relates to generating and training neural networks implemented by autonomous vehicles. For example, aspects of the present disclosure relate to systems and techniques for generating self-supervised neural networks and using pseudo-random sequences of traffic scenes for self-supervised training.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative examples and aspects of the present application are described in detail below with reference to the following figures:

FIG. 4 is a diagram illustrating examples of augmented inputs generated from an input describing, depicting, and/or representing an autonomous vehicle scene, according to some examples of the present disclosure;

FIG. 8 is a diagram illustrating an example system architecture for implementing certain aspects described herein.

DETAILED DESCRIPTION

Figure 1:
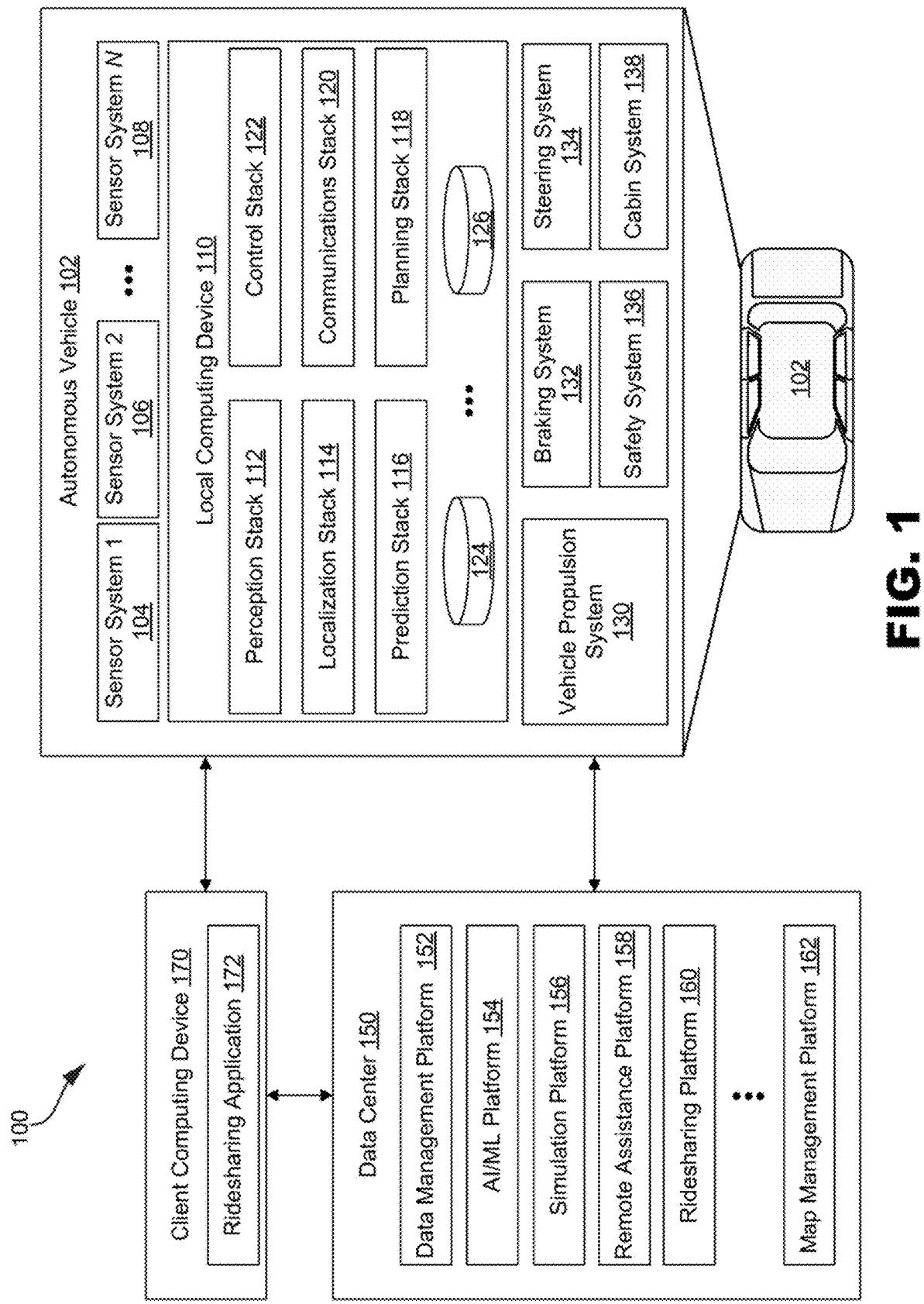
FIG. 1 is a diagram illustrating an example system environment that can be used to facilitate autonomous vehicle (AV) navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides aspects and examples of the disclosure, and is not intended to limit the scope, applicability, or configuration of the disclosure. Rather, the ensuing description of the aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, an inertial measurement unit (IMU), and/or an acoustic sensor (e.g., sound navigation and ranging (SONAR), microphone, etc.), global navigation satellite system (GNSS) and/or global positioning system (GPS) receiver, amongst others. The AVs can use the various sensors to collect data and measurements that the AVs can use for AV operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc. The sensors can provide the data and measurements to an internal computing system of the autonomous vehicle, which can use the data and measurements to control a mechanical system of the autonomous vehicle, such as a vehicle propulsion system, a braking system, and/or a steering system, for example.

The AV software is generally constructed using frameworks/platforms such as, for example, a robot operating system (ROS), which include software stacks configured to perform certain AV operations, process sensor data in a certain way, implement one or more functions/tasks, and/or implement certain AV behaviors. The software stacks can include software nodes configured to generate certain outputs (e.g., perform certain functions/tasks and generate associated outputs). In some examples, the AV software can include various software stacks for different functions/tasks such as, for example and without limitation, a perception stack, a planning stack, a prediction stack, a control stack, and/or a localization stack, among others. The software stacks may implement one or more neural networks configured to perform associated tasks such as vehicle localization, object detection, object tracking, route planning, predictions, etc.

In some cases, various models implemented by an AV such as, for example, the prediction and planning models, may have or implement a similar neural network backbones. The neural network backbones can predict various types of outputs such as, for example and without limitation, trajectory predictions for vehicles, trajectory predictions for pedestrians, trajectory predictions for bicycles and/or motorcycles, scene contextual right-of-way yield and assert probabilities, agent interactions (interactions of scene agents such as vehicles, pedestrians, animals, other road users, moving objects, etc., in a scene), cost fields, etc.

The backbone neural network used by one or more AV models can be very complex. For example, a backbone neural network may include a residual neural network (ResNet), a U-Net (e.g., a fully convolutional network), a PointNet, a transformer neural network, convolution operations, deconvolution operations, and/or other components and/or operations. Typically, each model is trained using a supervised training scheme (e.g., each model is trained as a supervised model) where the model predicts previously-collected labels and/or previously-labeled data. Moreover, each model generally has and/or is trained with a mined dataset that contains static and dynamic information such as a semantic map, street signs, traffic light states, historical observations of agents (e.g., the kinematics of scene agents, visual features associated with scene agents, etc.), and/or other outputs from one or more AV stacks (e.g., the perception, etc.), the semantic map, etc. The scene of the AV can include or be made up of such dynamic and static information (e.g., and/or the associated scene elements/objects). In some examples, each model can be separate due to various reasons such as, for example, historical reasons, for the ease and speed of development, etc.

In some cases, it may be desirable to enable various models to share a common backbone neural network that receives an AV scene as an input to the network. By allowing the various models to share a common backbone neural network, the system can achieve various benefits such as reduced latencies, cost-efficient scene encoding, and larger scale models, among other benefits. One example approach can include using a larger, common backbone neural network with several attached neural network heads that are task specific (e.g., task specialized neural network heads). However, using a larger, common backbone neural network with several attached task-specific neural network heads can be challenging, particularly if the backbone neural network is trained with the task-specific neural network heads. One example approach that can be used to avoid coupled training of a backbone neural network with the task-specific neural network heads can include using self-supervised learning to learn an AV scene and encode the AV scene in a common backbone neural network. The task-specific models can take the pretrained backbone neural network and train the task-specific neural network heads for specific tasks. In some examples, the training can be done with frozen or unfrozen weights of the backbone neural network and can implement a lower learning rate in order to keep the backbone neural network from becoming distorted.

In order to achieve higher stability/reliability, performance, and/or accuracy, the input used for the self-supervised training may need to be randomized, which can be difficult to do. For example, randomizing the input used in the self-supervised training can augment the input used to train the models and can allow the models to better learn patterns and semantic meanings of scene elements. However, augmenting an input traffic scene (e.g., by randomizing and/or distorting one or more elements of the input traffic scene) without losing its semantic meaning and context can be very difficult.

Systems, apparatuses, processes (also referred to as methods), and computer-readable media (collectively referred to as "systems and techniques") are described herein for generating and training neural networks implemented by autonomous vehicles. For example, the systems and techniques described herein can generate self-supervised neural networks and use pseudo-random sequences of traffic scene elements for self-supervised training. In some examples, a neural network backbone can be shared by several neural network heads configured to perform specific tasks. A neural network backbone can include a portion of a neural network that obtains an input, processes the input to obtain information associated with the input such as features extracted from the input, and passes the information to another portion(s) of the neural network called a neural network head which is configured to perform a specific task based on that information such as, for example and without limitation, a classification task, a regression task, a prediction task, etc. For example, in a neural network configured to perform classifications, the neural network backbone can include the neural network layers configured to obtain the input, perform certain tasks (e.g., pooling, convolution, etc.) to extract features from the input, and pass the extracted features to a neural network head, which includes a portion of the neural network configured to generate a classification output based on the extracted features.

In some examples, the systems and techniques described herein can configure a neural network backbone to perform self-supervised training. The neural network backbone can perform the self-supervised training based on a set of inputs such as, for example, randomized numerical distributions representing aspects of an AV scene. To illustrate, in some cases, a neural network backbone can take different, randomized numerical distributions representing a same scene and/or scene element(s) and learn the semantic meaning of that scene and/or scene element(s) even though the input representations are different, randomized numerical distributions which are not labeled to indicate their respective semantic meanings. In some examples, the neural network backbone can learn the semantic meaning of a scene and/or scene elements as previously explained, without having to learn and/or rebuild the geometries of elements in the scene. This approach of learning semantic meanings from different, randomized numerical distributions can increase the reliability/stability and speed of the neural network backbone, reduce the latency of the neural network backbone, and extend the capabilities of the neural network backbone without changing the compute budget/constraints of the neural network backbone.

In other examples, the systems and techniques described herein can generate specialized (e.g., task specific) neural networks or neural network heads and extend the scope or field-of-view/resolution of the specialized neural networks without increasing the budgeted compute associated with the specialized neural networks or neural network heads. A neural network head can include a portion of a neural network that is customized to perform a particular task such as, for example and without limitation, a classification task, a regression task, a prediction task, etc. For example, a neural network head can include neural network output layers configured to receive an input(s) from a backbone neural network and perform a specific task to generate an output based on the input(s) from the backbone neural network. In some examples, the systems and techniques described herein can randomize numerical distributions representing a scene and/or a scene element(s), and use such randomized numerical distributions to train a neural network head to perform a particular task and generate an output based on the randomized numerical distributions.

In some cases, the neural network head can perform self-supervised training, as previously explained.

In some examples, the construction of a self-supervised neural network model can assume or support the idea that similar scene inputs should contain similar output embeddings. The neural network model can implement any self-supervised training approach such as, for example, simple framework for contrastive learning (SimCLR), momentum contrast (MOCO), simple Siamese (SimSiam) representation learning, bootstrap your own latent (BYOL), variance-invariance-covariance regulation (VICReg), and/or any other self-supervised training approach. In some examples, the self-supervised neural network training approach can augment an initial input, send the augmented input through one or more neural network backbones, attach a projection network or neural network head to the one or more neural network backbones, and compare the generated embeddings using a method or task specific loss function.

An input can be augmented in various ways. For example, an input can be augmented by generating a cropped and/or resized version of the input, a flipped version of the input (e.g., where a scene element in the input is flipped), applying color distortion to the input, rotating a scene element in the input, applying a cutout to a portion of the input, applying Gaussian noise to the input, applying Gaussian blur to the input, applying Sobel filtering to the input, etc. Each of these versions of the input (e.g., the cropped and/or resized version of the input, the flipped version of the input, the version of the input with color distortion, the version of the input with the rotated scene element in the input, the version of the input with the cutout on a portion of the input, the version of the input with the Gaussian noise, the version of the input with the Gaussian blur, the version of the input with the Sobel filtering) can be used in addition to the input for self-supervised training and can augment the input by providing additional versions of the input for more robust training and/or learning.

Generally, the augmentation process (e.g., augmenting the input to the neural network) can be difficult. For example, as previously explained, an input can be augmented by inversion, rotation, cropping, resizing, color distortion, blurring, etc. However, it can be difficult to augment the input without losing or negatively impacting semantics and/or context information associated with the input, which can affect the accuracy and reliability of the training of the neural network, the output of the neural network, and/or the neural network in general. To illustrate, if the input includes a representation or depiction of a traffic scene to be processed by a neural network implemented by an autonomous vehicle, it can be difficult to augment the input (e.g., the representation or depiction of the traffic scene) without losing semantic and/or contextual information about the traffic scene, which the neural network may need to accurately learn aspects of the traffic scene and/or generate outputs based on the input representing or depicting the traffic scene.

One illustrative example approach for augmenting the input can include randomly distorting footprints and/or tracks of one or more scene agents (e.g., a vehicle in the scene, a pedestrian in the scene, an animal in the scene, a bicycle and/or motorcycle in the scene, etc.), applying random noise to scene kinematics, applying random noise to a traffic signal switching timing, etc. However, such distortions can potentially affect the semantics and/or context of the scene (and/or associated scene elements). For example, if the input includes a traffic scene and the input is augmented by adding noise to kinematics associated with the traffic scene, then the arrival time of a scene agent (e.g., vehicle, bicycle, motorcycle, etc.) to an all-way (e.g., a four-way) stop intersection can significantly change the scene, such as which agent goes first at the all-way stop intersection. As additional examples, applying footprint distortions associated with a scene agent can change portions of the scene with narrow spaces such as, for example, narrow parking lot scenarios and such, and applying distortions to traffic signal timing can disrupt or change the flow of traffic in the traffic scene, among potentially other disruptions/changes.

In some examples, the systems and techniques described herein can implement one of several approaches to encode a semantic map processed by a neural network. One example approach for encoding a semantic map is rasterization. With rasterization, map information can be converted into pixels in an image. Here, the type of area of a scene element (e.g., the lane or crosswalk in the previous example) can be represented by different properties (e.g., colors) and/or placed into different layers of an image tensor. The rasterization can apply one or more convolutional layers to summarize the information.

Semantic map vectorization is another example approach for encoding a semantic map. In some examples, semantic map vectorization can be used in VectorNet, Scene Transformer, Wayformer, and/or similar neural networks. The idea for the semantic map vectorization is to represent the semantic map boundaries as polylines (e.g., a set of ordered points (x, y) that describe the element of the semantic map). The polylines can include, for example, center lines of a lane, polygons describing the boundaries of an area (e.g., a crosswalk, a lane, etc.). A neural network model can summarize such points in various ways. For example, a neural network model can introduce deltas between consecutive points, orientations, orders, types, etc. However, points that describe the polygon may originate from a mapping software that has been preprocessed for the human visual cortex. A human looking at the polygon can involuntarily or subconsciously construct a shape associated with that polygon as well as the interior and exterior of that shape.

On the other hand, a neural network does not have such capacity by default. The neural network does not have such a human-like geometric intuition. In other words, a neural network by default may not be able to derive the shape of a polygon representing a scene element (e.g., a crosswalk, a lane, a sidewalk, etc.) and/or the semantic meaning of such shape from an input comprising a set of points representing that polygon, such as four points representing the polygon. As further described herein, the systems and techniques described herein can configure a neural network to use self-supervised training to recognize the semantic meaning of such a shape (e.g., a crosswalk, a lane, a sidewalk, etc.) from a set of input points corresponding to the shape.

In some aspects, the systems and techniques described herein can augment inputs used for self-supervised training of neural networks without losing and/or negatively impacting semantic and/or contextual information associated with the inputs. In some examples, the systems and techniques described herein can augment an input containing a traffic scene and used for self-supervised training of a neural network(s) by randomizing the input using one or more approaches as further described herein. For example, the systems and techniques described herein can randomize a semantic map representing a road and/or traffic scene. In some cases, an input can be randomized by generating different numerical distributions representing one or more aspects of the input such as, for example, one or more scene elements.

In some examples, the systems and techniques described herein can augment inputs including a scene element(s) by performing uniform sampling from semantic map elements to represent a semantic polygon(s) corresponding to the scene element(s). For example, if an input includes a polygon describing a lane or crosswalk in a scene associated with an autonomous vehicle (AV), the systems and techniques described herein can sample a set of points associated with the polygon. The number of points can be derived from a given density using any random sampling algorithm. Each point from the semantic map's polygon (e.g., the lane or crosswalk) can have a corresponding category (e.g., the lane or crosswalk) assigned to it. Points within a threshold vicinity/proximity (e.g., points within a closer vicinity/proximity) can be considered and/or assumed to be of a same type (e.g., points within the threshold vicinity/proximity can be considered to belong to and/or be part of the lane or crosswalk).

In cases where a point is sampled inside of a sidewalk in the scene but within a proximity to a road in the scene, the systems and techniques described herein can assume, by randomness, that there are one or more points within a proximity to that point that are sampled from the road within the proximity to the sidewalk. Points within a threshold proximity to each other from different types of areas may be clustered and/or classified together (e.g., within a same class). In some cases, the systems and techniques described herein can apply a sparse convolution to one or more of such points within the threshold proximity to each other. This can mean that if a line segment is drawn between close points (e.g., points within a threshold proximity to each other) where one point is sampled from the road and the other is sampled from the crosswalk, then the line segment may be influenced by area types corresponding to both points (e.g., the road and the crosswalk), but each point on the line segment can be weighed by the proximity to edges.

In some examples, this can be a consequence of sparse convolution layers and can represent how humans think about the road (e.g., one leg of the line segment is on a drivable portion of the road and the leg of the line segment is on the crosswalk). For example, a pedestrian may not always cross the road exactly within the crosswalk and thus might step outside of the crosswalk polygon. However, the pedestrian can nevertheless be considered to have the right-of-way granted by the point sampled from the crosswalk (e.g., in addition to the point sampled from the road). Thus, in some examples, there can be a natural influence on points sampled from a road by the proximity of points samples from a crosswalk (e.g., by the proximity of a crosswalk to the road). In some cases, the systems and techniques described herein can apply raster maps with convolutions to sampled points in order to obtain some of this benefit due to the increasing field-of-view (FOV). Moreover, for a raster map representation, the systems and techniques described herein can select a pixel anchor for the pedestrian in the scene (e.g., the pedestrian crossing the crosswalk in the previous example).

Generally, random samples of points in a scene tend to cluster together. This can be a problem in large-scale Monte Carlo methods such as option pricing or financial risk management. The systems and techniques described herein can reduce or eliminate this problem by pseudo-random sampling points. For example, the systems and techniques described herein can implement a pseudo-sampling technique such as Sobol sequences. Sobol sequences (also called $LP_T$ sequences or (t, s) sequences in base 2) are an example of quasi-random low-discrepancy sequences. The Sobol sequences use a base of two to form successively finer uniform partitions of a unit interval and then reorder the coordinates in each dimension.

The systems and techniques described herein can randomize a Sobol sequence associated with an input given different initial seeds. The randomized Sobol sequence can provide more spaced-out points with better and more uniform coverage and lower informational variance per point. The Sobol sequences used herein can punish clustering of points and derive a more manageable spread of points, which can help identify points corresponding to a shape (e.g., a crosswalk, a lane, a sidewalk, etc.) versus other points within a vicinity that correspond to a different shape. Moreover, the density of the points can be used as a parameter for generating the Sobol sequence, which can allow for a multilevel density generation. In some examples, the systems and techniques described herein can define and implement a budget of the number of points to be generated around each scene agent where closer scene agents may receive more map points relative to scene agents that are farther away agents.

In some aspects, the systems and techniques described herein can generate scene level points or several layers of points tiled by distance. For example, the systems and techniques described herein can define a total number of semantic map points based on the capacity of the neural network backbone (e.g., a predefined number of points associated with the neural network backbone). This can allow the size of the tensors to be limited, and the slices from that budget to be distributed. For example, assume that the systems and techniques described herein define square map tiles and tiles closer to an autonomous vehicle receive more points compared to tiles farther away from the autonomous vehicle. The systems and techniques described herein can then add more points around each interesting/desired object, dynamic agent, and/or static street sign within a proximity to the intersection. The tile of an agent closer to the autonomous vehicle can receive more points while the tile of an agent that is farther away can receive less points. The scheme can be configured in various ways, and different ways to distribute the budget of points can lead to further optimizations.

In some aspects, the training loop for the self-supervised learning described herein can be as follows. First, the systems and techniques described herein can obtain a scene from a training example/dataset. The systems and techniques described herein can obtain the scene and generate semantic points using a selected budget scheme (e.g., a budget scene for points as previously explained). The systems and techniques described herein can combine points with scene agents and road artifacts (e.g., a traffic light, etc.), convert the resulting scene into input tensors, and send the input tensors through the self-supervised neural network.

The input can be randomized and used to train the backbone neural network until a desired level of convergence is achieved. The final backbone neural network embeddings can encode the scene, hence, the representation learning. The backbone neural network can be used by a large number of neural network models to extract a generalized scene representation.

Examples of the systems and techniques described herein are illustrated in FIG. 1 through FIG. 8 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170.

These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data.

Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 8.

As previously explained, generally, the human visual cortex is able to understand or infer a geometric shape from a set of points representing such geometric shape. For example, a human looking at points within a polygon generally can involuntarily or subconsciously construct a shape associated with those points within the polygon as well as the interior and exterior of the shape. On the other hand, a neural network does not have such capacity by default. The neural network does not have such a human-like geometric intuition. In other words, a neural network by default may not be able to derive the shape or semantic meaning of a polygon representing a scene element (e.g., a crosswalk, a lane, a sidewalk, etc.) from an input comprising a set of points representing that polygon. However, the systems and techniques described herein can configure a neural network to use self-supervised training to learn and recognize such a shape (e.g., a crosswalk, a lane, a sidewalk, etc.) from a set of input points corresponding to such shape. For example, the systems and techniques described herein can configure a neural network to use self-supervised training to learn the semantic meaning of points/samples of a shape representing a scene element such as, for example, a crosswalk, an intersection, a traffic lane, an ingress or egress ramp, a sidewalk, etc.

The systems and techniques described herein can configure a neural network to use self-supervised training to learn and recognize a variety of shapes of scene elements from a limited number of points within such shapes (e.g., along a boundary of such shapes and/or within an interior of such shapes). For example, the semantic meaning of some shapes may generally be more difficult to ascertain from a small set of points than other shapes. To illustrate, a straight line can be defined with fewer points than a shorter and curvy line as the shape of a straight line may be easier to infer or imagine from two points (or a small set of points that is greater than two) than a shorter and curvy line. The geometric reasoning of humans, aided by the human visual cortex, can typically imagine or ascertain a straight line or even a shorter, curvy line from a small set of points. However, a neural network does not have implied knowledge of the span of a straight line, a curvy line, or another geometric shape that the neural network may not, by default, ascertain or infer from a few set of points.

The systems and techniques described herein can configure a neural network to use self-supervised training to learn and recognize a variety of shapes of scene elements from a limited number of points defining such shapes. In some aspects, the systems and techniques described herein can configure a neural network to use self-supervised training to determine the semantic meaning of a geometric shape(s) representing a scene element(s) from an input that includes an unlabeled set of points and/or an unlabeled numerical representation of such a geometric shape(s) and scene element(s). For example, the systems and techniques described herein can learn to recognize (e.g., determine a semantic meaning of) a straight lane, a curvy lane, and/or any other scene element shape from two or more points defining such shape(s). Moreover, the systems and techniques described herein can configure the neural network to use self-supervised training to learn and recognize a variety of shapes of scene elements from any distribution and/or arrangement of points defining such shapes. For example, the systems and techniques described herein can configure the neural network to use self-supervised training to learn and detect the semantic meanings of any distribution and/or arrangement of points defining such shapes of scene elements. Moreover, the systems and techniques described herein can augment inputs describing shapes of scene elements that are used for self-supervised training of neural networks without losing and/or negatively impacting semantic and/or contextual information associated with such inputs.

In some examples, the systems and techniques described herein can augment an input containing a traffic scene and used for self-supervised training of a neural network(s) by randomizing the input using one or more approaches as further described herein. For example, the systems and techniques described herein can randomize a semantic map (and/or data thereof) representing a traffic scene and/or a scene element(s) in the traffic scene. In some cases, an input can be randomized by generating different numerical distributions representing one or more aspects of the input such as, for example, one or more scene elements of a traffic scene. The systems and techniques described herein can allow a neural network to recognize a scene element shape (e.g., determine a semantic meaning of the input) despite the randomizing of the input associated with the scene element and despite what numerical distribution(s) is/are used to define/represent the shape of that scene element.

In some examples, the input can be augmented by generating different versions of the input such as, for example and without limitation, a cropped and/or resized version of the input, a color distorted version of the input, a rotated version of the input, a version of the input with a cutout blocking or occluding a portion of the input, a version of the input with noise, and/or any other version of the input. A neural network configured and trained according to the systems and techniques described herein can learn to recognize the input (e.g., to recognize the semantic meaning of the input) and ignore the augmentation applied to the input (and/or despite the augmentation applied to the input). For example, the neural network can recognize the semantic meaning of the input and/or the shape of the input and distinguish and/or separate the shape of the input from the augmentation applied to the input (e.g., from the cropping of the input, the resizing of the input, the cutout blocking or occluding a portion of the input, the noise added to the input, the rotation of the input, etc.). By training the neural network on augmented inputs, the amount of training data used to train the neural network can be increased to yield a more robust and accurate neural network.

Figure 2:
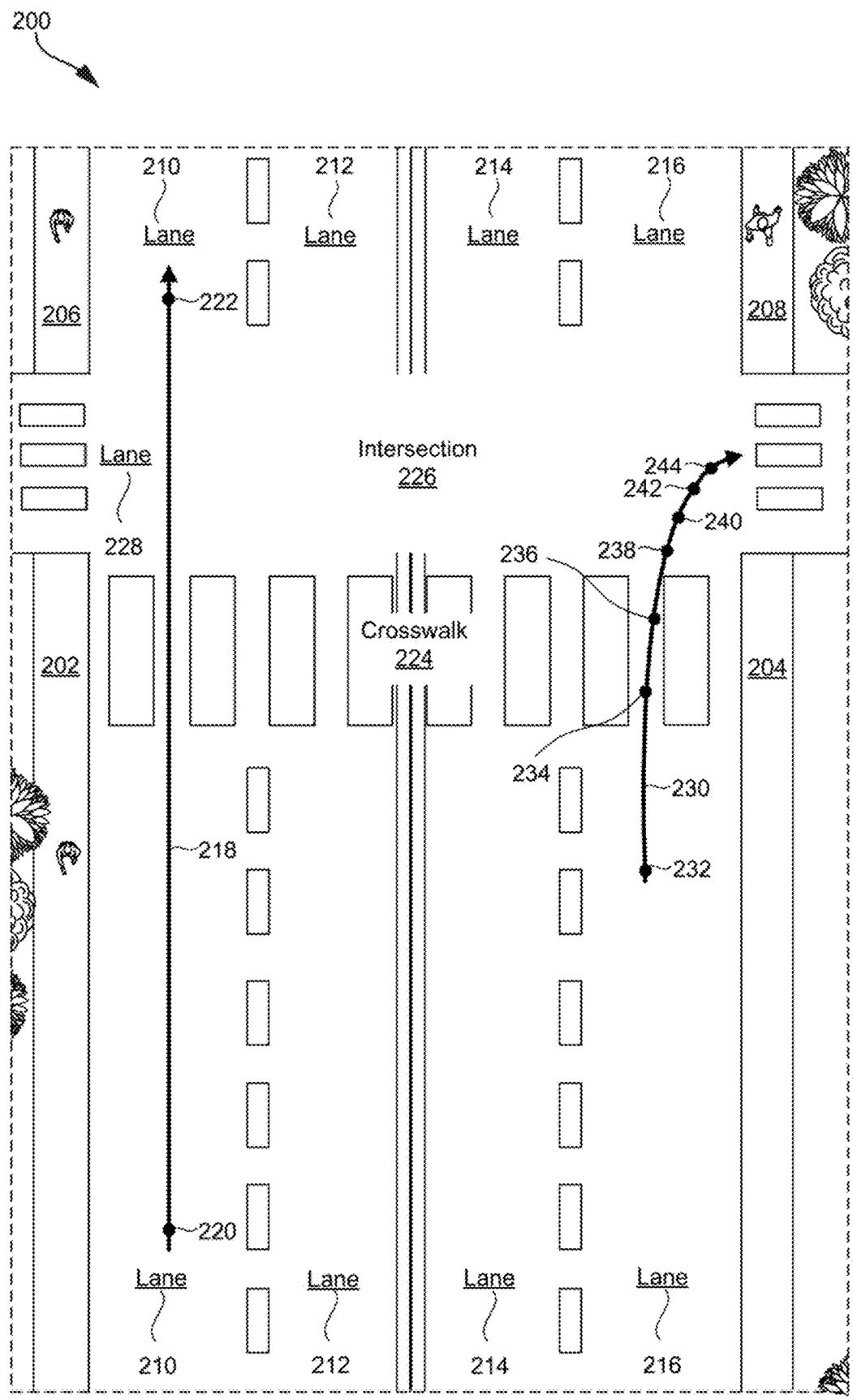
FIG. 2 is a diagram illustrating an example autonomous vehicle scene with a straight line along a lane that is represented by two points and a curved line along lanes that is represented by a set of points, according to some examples of the present disclosure.

FIG. 2 is a diagram illustrating an example AV scene 200 with a straight line 218 along a lane 210 that is represented (the straight line 218) by two points (e.g., points 220 and 222) and a curved line 230 along the lane 216 and the lane 228 that is represented (the curved line 230) by a set of points (e.g., points 232 through 244). In this example, the AV scene 200 includes sidewalks 202-208, lanes 210-216, a crosswalk 224, an intersection 226, and a lane 228 running perpendicular to the lanes 210-216 and through the intersection 226.

As shown, the straight line 218 along the lane 210 is represented by points 220 and 222, and the curved line 230 along the lane 216 and the lane 228 is represented by the points 232 through 244. Given the simplicity of the straight line 218 relative to the curved line 230, the straight line 218 can be described by fewer points than the curved line 230. Moreover, with the aid of the human visual cortex, a human can generally infer, ascertain, and/or imagine the straight line 218 from the points 220 and 222, and the curved line 230 from the points 232 through 244. However, by default, a neural network cannot infer, ascertain, and/or imagine the straight line 218 from the points 220 and 222 or the curved line 230 from the points 232 through 244. Advantageously, the systems and techniques described herein can allow a neural network to infer, ascertain, and/or imagine the straight line 218 from the points 220 and 222 or the curved line 230 from the points 232 through 244.

Further, the systems and techniques described herein can allow the neural network to infer, ascertain, and/or learn the semantic meaning of points associated with the straight line 218 from as few as two points (e.g., points 220 and 222), regardless of their placement within/along the straight line 218. Similarly, the systems and techniques described herein can allow the neural network to infer, ascertain, and/or learn the semantic meaning of points associated with the curved line 230 from fewer than the points 232 through 244 illustrated in FIG. 2, regardless of their placement within/along the curved line 230. In this way, the neural network trained according to the systems and techniques described herein can infer, ascertain, and/or learn the semantic meaning of a small set of points corresponding to any shape of any traffic scene element (e.g., from a small set of points along a border of the shape and/or within an interior and/or exterior of that shape). Moreover, as further described herein, the neural network trained according to the systems and techniques described herein can infer, ascertain, and/or learn the semantic meaning of a shape of any traffic scene element from a small set of points corresponding to that shape regardless of the distribution, arrangement, and/or placement of such points relative to the shape.

Figure 3:
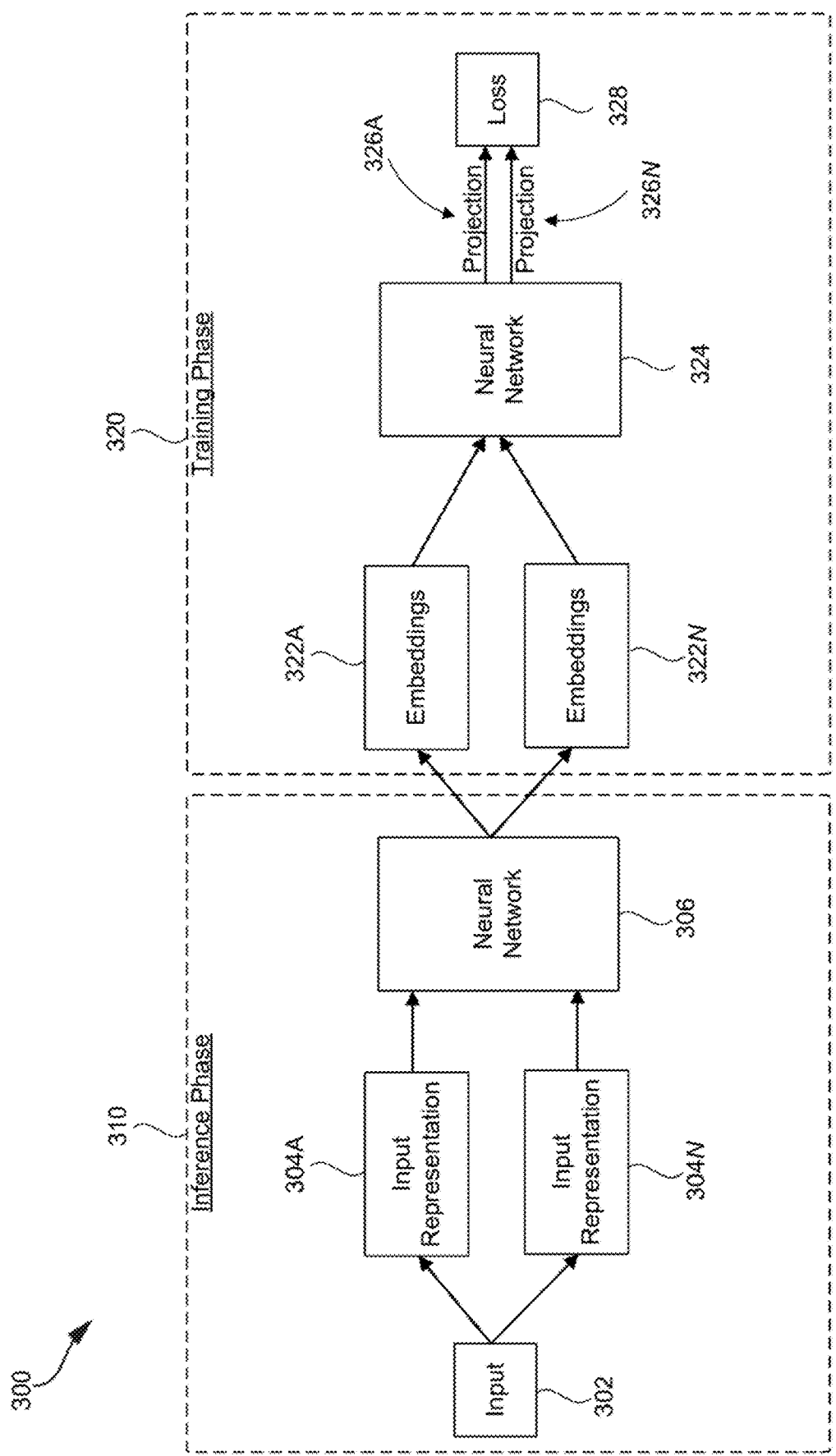
FIG. 3 is a diagram illustrating an example system configuring self-supervised neural networks and using pseudo-random sequences of traffic scenes for self-supervised training, according to some examples of the present disclosure.

FIG. 3 is a diagram illustrating an example system 300 configuring self-supervised neural networks and using pseudo-random sequences of traffic scenes (and/or traffic scene elements) for self-supervised training. The system 300 includes a neural network 306 that can be used during an inference phase 310 (e.g., to make detections, recognitions, classifications and/or predictions) and a neural network 324 that can be used in a training phase 320 to train the neural network 306 used during the inference phase 310. The training phase 320 can include a self-supervising training phase in which the system 300 can train the neural network 306 without manual user inputs (e.g., labels) and without use of a labeled training dataset.

In this example, the system 300 can generate input representations 304A through 304N from an input 302 describing, depicting, and/or representing an AV scene (e.g., AV scene 200) and/or one or more scene elements within an AV scene. In some cases, the input 302 can include an image of an AV scene and/or one or more scene elements within an AV scene. In other cases, the input 302 can additionally or alternatively include a map, such as a semantic map and/or a vectorized map, of an AV scene. In yet other cases, the input 302 can additionally or alternatively include a numerical representation of an AV scene and/or one or more scene elements in an AV scene.

In some examples, the input representations 304A through 304N can include numerical distributions representing, describing, and/or defining the input 302 and/or one or more elements thereof. For example, the input representations 304A through 304N can include one or more vectors representing, describing, and/or defining the input 302 and/or one or more elements thereof. To illustrate, if the input 302 includes the AV scene 200, the input representations 304A through 304N can include one or more numerical distributions (e.g., vectors, arrays of datapoints, etc.) representing the AV scene 200 and/or one or more elements thereof such as, for example, the sidewalks 202-208, the lanes 210-216, the straight line 218 along the lane 210, the crosswalk 224, the intersection 226, the lane 228, and/or the curved line 230 along the lane 216 and the lane 228.

In an illustrative example, the input representations 304A through 304N can each include one or more tensors, matrices, distributions, and/or arrays of components and/or numbers associated with (e.g., describing, representing, depicting, etc.) one or more scene elements in the input 302. For example, the input representations 304A through 304N can each include one or more numerical representations of the input 302 and/or one or more scene elements in the input 302. In some cases, the input representations 304A through 304N can additionally or alternatively include a set of ordered points associated with the input 302. Moreover, in some cases, the input representations 304A through 304N can encode information about the input 302 and/or about the AV scene associated with the input 302.

For example, the input representations 304A through 304N can encode location information (e.g., coordinates in space) and/or position information (e.g., orientation information, location information, etc.) of one or more scene elements (and/or associated components) associated with the input 302, depth information of one or more scene elements (and/or associated components) associated with the input 302, color information of one or more scene elements associated with the input 302, relative distances and/or positions of one or more scene elements (and/or associated components) associated with the input 302, one or more relationships of one or more scene elements (and/or associated components) associated with the input 302, shape information of one or more scene elements (and/or associated components) associated with the input 302, intensities of pixels corresponding to one or more scene elements (and/or associated components) associated with the input 302, color information of one or more scene elements (and/or associated components) associated with the input 302, size information of one or more scene elements (and/or associated components) associated with the input 302, one or more distributions of datapoints corresponding to one or more scene elements (and/or associated components) associated with the input 302, noise information of one or more scene elements (and/or associated components) associated with the input 302, one or more categories of one or more scene elements (and/or associated components) associated with the input 302, one or more visual features of one or more scene elements (and/or associated components) associated with the input 302, contextual information of one or more scene elements (and/or associated components) associated with the input 302, spatial coordinates of one or more scene elements (and/or associated components) associated with the input 302, distance and/or magnitude information of datapoints of one or more scene elements (and/or associated components) associated with the input 302, pixel and/or latent space of datapoints of one or more scene elements (and/or associated components) associated with the input 302, semantic information of one or more scene elements (and/or associated components and/or datapoints) associated with the input 302, scene and/or object kinematics associated with the input 302, spatial distributions of datapoints and/or scene elements (and/or associated components) associated with the input 302, and/or any other information associated with the input 302.

In some examples, to generate the input representations 304A through 304N, the system 300 can augment the input 302 and derive numerical distributions (e.g., vectors, arrays of datapoints, etc.) describing the augmented versions of the input 302. Thus, the input representations 304A through 304N can include augmented inputs generated from the input 302. The system 300 can generate the input representations 304A through 304N by applying any distortions, perturbations, and/or modifications to the input 302. For example, the system 300 can generate the input representations 304A through 304N by cropping the input 302, resizing the input 302, cropping and resizing the input 302, changing a pose of the input 302 (e.g., rotating or flipping the input 302, changing an orientation of the input 302, etc.), applying noise to the input 302 (e.g., applying Gaussian noise, Gaussian blur, and/or any other noise), applying a color distortion to the input 302, applying Sobel filtering to the input 302, overlaying a cutout or occlusion to the input 302 that blocks/occludes at least a portion of the input 302, and/or applying any other distortion, perturbation, and/or modification to the input 302.

By applying various distortions, perturbations, and/or modifications to the input 302 to generate different input representations 304A through 304N of the input 302, the system 300 can ensure that the neural network 306 is trained to, and learns to, recognize a semantic meaning of data corresponding to any shape(s) of any scene element(s) in the input 302 regardless of the distortions, perturbations, and/or modifications to the input 302 and without having to learn or detect the geometric shape of that scene element(s). For example, by applying various distortions, perturbations, and/or modifications to the input 302 to generate different input representations 304A through 304N of the input 302, the system 300 can ensure that the neural network 306 is trained to, and learns to, distinguish between the semantic meaning of any shape(s) (and/or of any associated inputs) of any scene elements in the input 302 and the distortions, perturbations, and/or modifications applied to the input 302. In other words, by applying various distortions, perturbations, and/or modifications to the input 302 to generate different input representations 304A through 304N of the input 302, the system 300 can ensure that the neural network 306 is trained to, and learns to, separate the semantic meaning of shape(s) of any scene elements in the input 302 from any of the distortions, perturbations, and/or modifications applied to the input 302. This in turn allows the neural network 306 to become more reliable, robust, accurate, etc., and capable of recognizing the semantic meaning of shapes of scene elements regardless of the context and/or differences in the scene elements.

It can be very difficult or impossible to anticipate every possible configuration (e.g., shape, arrangement, placement, perturbation/variation, etc.) of every scene element that an AV (e.g., AV 102) implementing the neural network 306 may experience in the real world, and it can be very difficult or impossible to train the neural network 306 with every possible configuration of every scene element that the AV implementing the neural network 306 can experience in the real world. However, by training the neural network 306 to learn to distinguish between the semantic meaning of shape(s) (and/or associated inputs) of any type of scene element given any configuration of such scene element (e.g., by training the neural network 306 to recognize any type of scene element regardless of its shape, context, and/or configuration) as described herein, the system 300 can ensure that the neural network 306 is able to detect/recognize the semantic meaning of any type of scene element (and/or shape thereof) experienced by the AV in the real world, regardless of any context, configuration, and/or variation associated with such scene element and/or associated input.

The system 300 can provide the input representations 304A through 304N to the neural network 306 for processing. In this example, the neural network 306 can include one or more neural network backbones and/or one or more neural network heads. In some examples, the neural network 306 can include a ResNet, a UNet, a PointNet, a transformer, one or more convolution layers, one or more deconvolution layers, and/or any other network and/or components.

The neural network 306 can be configured to generate embeddings 322A through 322N based on the input representations 304A through 304N. The embeddings 322A through 322N can include vectors and/or arrays that describe and/or represent the input representations 304A through 304N in n-dimensional space. In some examples, the embeddings 322A through 322N can capture the semantics of the input representations 304A through 304N by placing semantically related/similar datapoints closer together (e.g., relative to semantically unrelated/dissimilar datapoints) in the embedding space. In some cases, the embeddings 322A through 322N can additionally or alternatively provide a mapping of discrete, categorical variables to vectors of numbers. For example, the embeddings 322A through 322N can include low-dimensional vector representations of discrete variables associated with the input representations 304A through 304N. In some cases, the embeddings 322A through 322N can encode information about datapoints associated with the input representations 304A through 304N such as, for example and without limitation, semantic information, contextual information, spatial information and/or relationships, color information, depth and/or distance information, class/category information, distribution information, location information, shape information, and/or any other information.

In some cases, the neural network 306 can be implemented during an inference phase 310 to generate one or more predictions and/or classifications such as, for example, a classification of one or more scene elements represented by the input representations 304A through 304N, an indication of a semantic meaning of a shape of one or more scene elements represented by the input representations 304A through 304N, etc. Moreover, during a training phase 320, the neural network 306 can be implemented to generate the embeddings 322A through 322N and provide the embeddings 322A through 322N to a neural network 324 used to train (e.g., via self-supervised training) the neural network 306 as further described herein.

As shown in FIG. 3, the neural network 306 can provide the embeddings 322A through 322N to the neural network 324 for processing. The neural network 324 can generate projections 326A through 326N based on the embeddings 322A through 322N. To generate the projections 326A through 326N, the neural network 324 can project the embeddings 322A through 322N to n-dimensional space. For example, the neural network 324 can project the embeddings 322A through 322N to high-dimensional space. Thus, in some examples, the projections 326A through 326N can include representations of the embeddings 322A through 322N projected to high-dimensional space. In some cases, the projections 326A through 326N can include one or more vectors/arrays representing the embeddings 322A through 322N and/or one or more vectors of probabilities associated with the embeddings 322A through 322N. In some examples, the projections 326A through 326N can capture and/or describe the semantics of the embeddings 322A through 322N by placing semantically related/similar datapoints closer together (e.g., relative to semantically unrelated/dissimilar datapoints) in space.

The neural network 324 can compare the projections 326A through 326N to generate a loss 328 based on the comparison of the projections 326A through 326N. In some examples, the loss 328 can include a contrastive loss generated by the neural network 324 based on the comparison of the projections 326A through 326N. In some cases, the loss 328 can be based on and/or describe differences and/or gradients between the projections 326A through 326N. In an illustrative example, the loss 328 can take the output of the neural network 324 (e.g., projections 326A through 326N) for a positive example and calculate its distance to an example of the same class and contrast that with the distance to negative examples. Moreover, the loss 328 can be low if positive samples are encoded to similar (e.g., closer) representations and negative examples are encoded to different (e.g., farther) representations. In some cases, the neural network 324 and/or the loss 328 generated by the neural network 324 can treat the distance of a positive example and the distances of negative examples as output probabilities and use one or more cross-entropy losses.

The neural network 324 can generate the loss 328 based on one or more loss functions. Non-limiting examples of loss functions that can be used to generate the loss 328 can include a contrastive loss function, a similarity function, a means-squared error (MSE) function, a cross-entropy loss function, a softmax loss function, and/or any other loss function. The system 300 can use the loss 328 to train the neural network 306. For example, the system 300 can use the loss 328 to adjust (or validate) one or more parameters implemented by the neural network 306 such as, for example, weights/biases implemented by the neural network 306, activation functions implemented by the neural network 306, and/or other parameters. In some examples, during the training phase 320, the system 300 can iteratively generate losses and update the neural network 306 until a certain result is achieved (e.g., until the loss 328 is at or below a threshold).

FIG. 4 is a diagram illustrating examples of augmented inputs 402-414 (e.g., input representations 304A through 304N or representations/views thereof) generated from an input 400 describing, depicting, and/or representing an AV scene (e.g., AV scene 200). The augmented inputs 402-414 can be used as inputs to a neural network (e.g., neural network 306) configured to generate one or more outputs based on the augmented inputs 402-414 such as, for example, one or more classification outputs, one or more predictions, one or more detection outputs, etc.

The augmented inputs 402-414 can include perturbations/modifications applied to the data (e.g., the inputs), which can be used to train a neural network to distinguish between the semantic meaning of an input and perturbations/modifications applied to the input. In FIG. 4, the object depicted in the inputs is a vehicle. The vehicle is used in FIG. 4 merely for explanation purposes as an illustrative example of an object reflecting perturbations/modifications that can be applied to input data used to train a neural network. The illustrated perturbations/modifications can be applied to inputs depicting and/or representing any other type of object and/or scene element such as, for example and without limitation, a crosswalk, an intersection, a traffic lane, an egress and/or ingress ramp, a sidewalk, and/or any other object and/or scene element. Moreover, the type, number, combination, and/or characteristics of the augmented inputs 402-414 in FIG. 4 are merely illustrative examples provided for explanation purposes. One of ordinary skill in the art will recognize from the present disclosure that, in other examples, the augmented inputs 402-414 can include a different number, type(s), combination, and/or characteristics of augmented inputs than shown in FIG. 4.

The input 400 represents an original input used to generate the augmented inputs 402-414. In this example, the input 400 depicts a vehicle. However, in other examples, the input 400 can depict any other scene element(s) or combination of scene elements such as, for example and without limitation, a pedestrian, a crosswalk, a lane, a bicycle, a motorcycle, an animal, a traffic signal, a train track, an ingress and/or egress ramp, a bridge, a building, a traffic light, a median, a traffic cone, a construction zone, a parking lot, a toll booth, and/or any other scene element.

The augmented input 402 depicts the vehicle from the input 400 rotated by 90 degrees. Similarly, the augmented input 404 depicts the vehicle from the input 400 flipped (e.g., rotated by 180 degrees). The augmented input 406 depicts the vehicle from the input 400 with blurring applied to the depicted vehicle.

The augmented input 408 depicts the vehicle from the input 400 with a cutout 420 that blocks/occludes a portion of the vehicle depicted in the augmented input 408. The augmented input 410 depicts the vehicle from the input 400 cropped and resized. The cropping of the vehicle in the augmented input 410 cuts a portion of the vehicle from the input and leaves a remaining portion of the vehicle, which is resized. In this example, the resizing of the cropped vehicle includes increasing the size of the cropped vehicle. In other examples, the resizing of the cropped vehicle can include decreasing the size of the cropped vehicle.

The augmented input 412 depicts the vehicle from the input 400 with color distortion applied to it. Moreover, the augmented input 414 depicts the vehicle from the input 400 resized (without cropping).

The augmented inputs 402-414 can be converted into numerical representations (e.g., vectors, etc.) of the input 400, such as input representations 304A through 304N shown in FIG. 3. The augmented inputs 402-414 can provide modifications, distortions, perturbations, and/or variations of the input 400 without removing the semantics and/or context of the input 400. In some examples, the augmented inputs 402-414 can be used to generate random (or pseudo-random) numerical representations (e.g., distributions and/or vectors) of the input 400.

The augmented inputs 402-414 can be used to train a neural network to detect the vehicle from the input 400 from variations of the input 400 in order to obtain a more robust, reliable, and/or accurate neural network. For example, the augmented inputs 402-414 can be used to expand the training data (e.g., the input 400) used to train the neural network and can be used to train the neural network to detect the semantic meaning (e.g., a vehicle) of the shapes in the augmented inputs 402-414 and/or distinguish between the vehicle depicted in the augmented inputs 402-414 and the modifications, distortions, perturbations, and/or variations applied to the input 400 (e.g., the color distortion, the noise, the cropping, the resizing, the rotation, the flipping, the occlusion from the cutout 420, etc.).

Figure 5A:
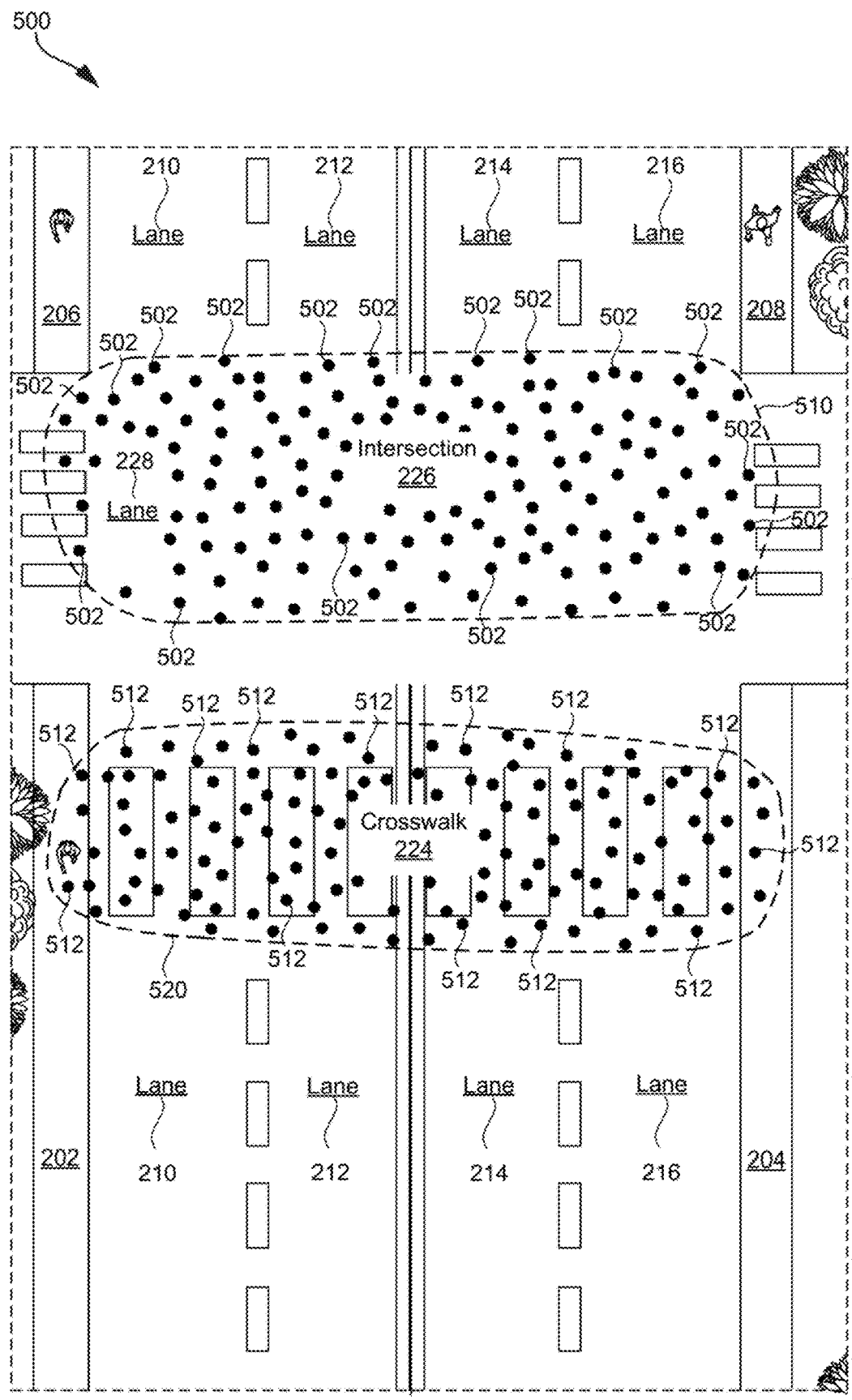
FIG. 5A is a diagram illustrating an example semantic map of an autonomous vehicle scene with point clouds corresponding to scene elements in the autonomous vehicle scene, according to some examples of the present disclosure.

FIG. 5A is a diagram illustrating an example semantic map 500 of an AV scene (e.g., AV scene 200) with point clouds 510 and 520 corresponding to scene elements in the AV scene. The point cloud 510 includes datapoints 502 corresponding to the intersection 226 in the semantic map 500. For example, the datapoints 502 (and the point cloud 510) can describe and/or represent the intersection 226. Moreover, the point cloud 510 can include datapoints 502 along and/or within a boundary of the intersection 226. In some cases, the point cloud 510 can additionally include datapoints 502 that are outside of the boundary of the intersection 226 and instead correspond to another scene element such as, for example, the lane 228, a crosswalk in the lane 228, and/or any other scene element. Generally, datapoints that are closer to each other can relate to a same semantic class, and datapoints that are farther apart can relate to a different semantic class or classes.

In some examples, the datapoints 502 (or a portion thereof) can represent numerical values in one or more vectors describing the intersection 226. Moreover, the datapoints 502 (and/or a distribution of the datapoints 502) can be augmented to generate augmented inputs for use in training a neural network as previously described. For example, the datapoints 502 can be used to generate randomized distributions of datapoints representing the intersection 226. The different, randomized distributions of datapoints can be used to train a neural network as further described herein.

The point cloud 520 includes datapoints 512 corresponding to the crosswalk 224 in the semantic map 500. For example, the datapoints 512 (and the point cloud 520) can describe and/or represent the crosswalk 224. Moreover, the point cloud 520 can include datapoints 512 along and/or within a boundary of the crosswalk 224. In some cases, the point cloud 520 can additionally include datapoints 512 that are outside of the boundary of the crosswalk 224 and instead correspond to another scene element such as, for example, the sidewalk 202, the sidewalk 204, the lane 210, the lane 212, the lane 214, the lane 216, and/or any other scene element. As previously noted, datapoints that are closer to each other can generally relate to a same semantic class, and datapoints that are farther apart can relate to a different semantic class or classes.

In some examples, the datapoints 512 (or a portion thereof) can represent numerical values in one or more vectors describing the crosswalk 224. Moreover, the datapoints 512 (and/or a distribution of the datapoints 512) can be augmented to generate augmented inputs for use in training a neural network as previously described. For example, the datapoints 512 can be used to generate randomized distributions of datapoints representing the crosswalk 224. The different, randomized distributions of datapoints can be used to train a neural network as further described herein.

The number of datapoints in the point clouds 510 and 520 depicted in FIG. 5A are merely illustrative examples provided for explanation purposes. In other examples, the point cloud 510 and/or the point cloud 520 can include more or less datapoints than shown in FIG. 5A. For example, each of the point clouds 510 and 520 can include two or more datapoints, which can be used to describe, represent, and/or imagine the scene elements associated with the point clouds 510 and 520 (e.g., the intersection 226 and the crosswalk 224).

Figure 5B:
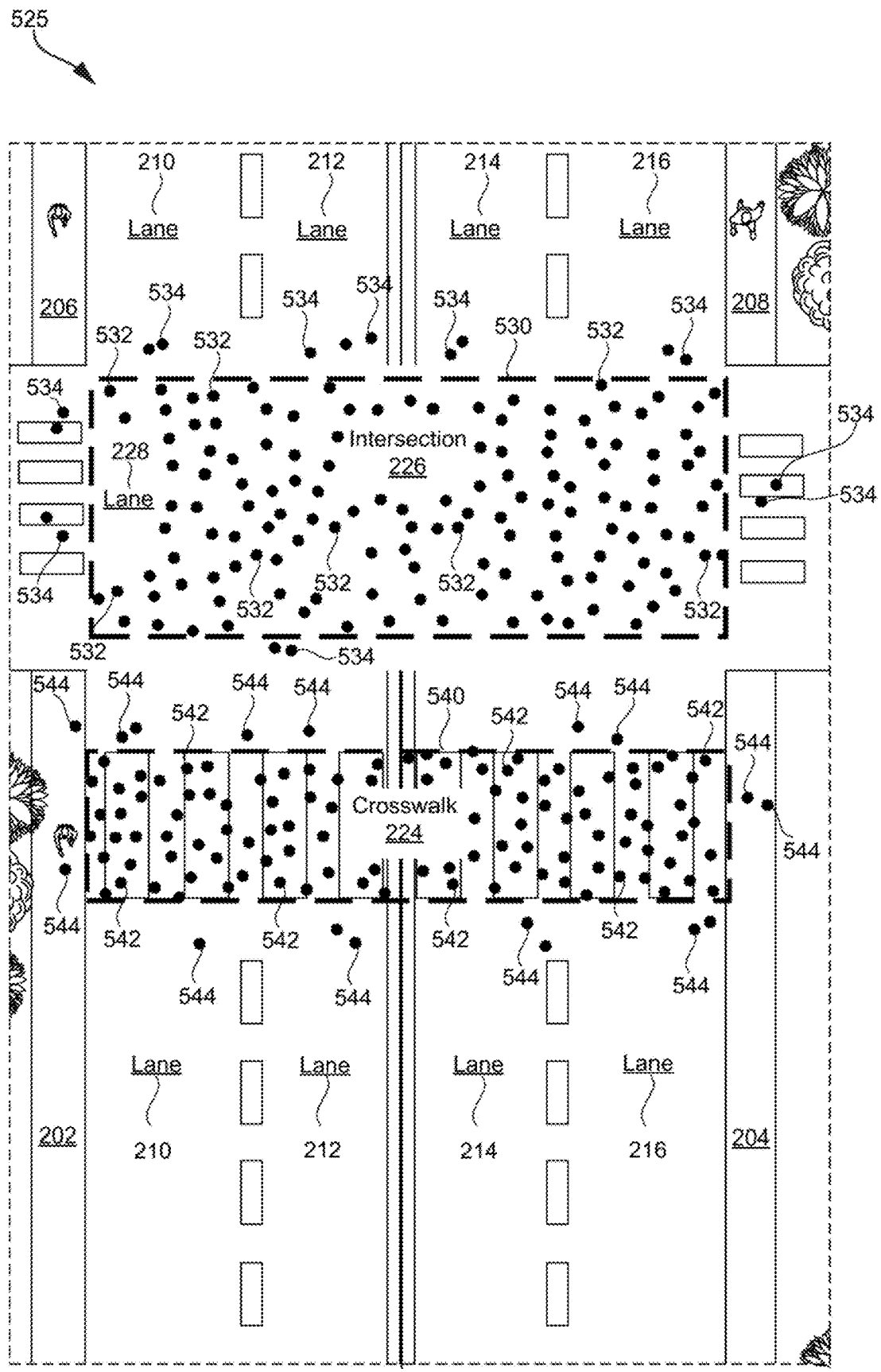
FIGS. 5B and 5C are diagrams illustrating example semantic maps of an autonomous vehicle scene with datapoints representing scene elements in the autonomous vehicle scene, according to some examples of the present disclosure.

FIG. 5B is a diagram illustrating another example semantic map 525 of an AV scene (e.g., AV scene 200) with datapoints representing scene elements in the AV scene. In this example, a neural network (e.g., neural network 306) can determine a semantic meaning (e.g., an intersection) of the datapoints 532 and 534 associated with the intersection 226 based on a distribution of the datapoints 532 and 534 associated with the intersection 226. Similarly, the neural network can determine the semantic meaning (e.g., a crosswalk) of the datapoints 542 and 544 associated with the crosswalk 224 based on a distribution of the datapoints 542 and 544 associated with the crosswalk 224.

As shown in FIG. 5B, the distribution of datapoints 532 and 534 can include datapoints 532 within a boundary of a shape 530 of the intersection 226 (e.g., along the boundary and/or inside of the boundary) and datapoints 534 outside of the boundary of the shape 530 of the intersection 226. The neural network can be trained to and can learn to use the datapoints 532 within the boundary of the shape 530 of the intersection 226 to determine a semantic meaning (e.g., the intersection 226) of the datapoints 532 associated with the intersection 226. For example, the neural network can be trained to and can learn to use the datapoints 532 associated with the intersection 226 to determine that the datapoints 532 represent and/or correspond to an intersection. In some cases, the neural network can also determine the boundary of the shape 530 of the intersection 226 as well as an interior of the shape 530 of the intersection 226 based on the datapoints 532. In some cases, the neural network can also be trained to and can learn to recognize/determine that the datapoints 534 located outside of the boundary of the shape 530 of the intersection 226 do not belong to the intersection 226 (e.g., do not describe and/or represent any portion of the intersection 226).

In some examples, the neural network can determine which datapoints belong to (e.g., describe, represent, and/or correspond to) the intersection 226 and which datapoints do not belong to the intersection 226 based on respective distances between the datapoints and/or patterns in the datapoints. For example, the neural network can determine that datapoints (e.g., datapoints 532) that are closer in proximity to each other and/or are clustered closer together in space (e.g., within a threshold distance of each other) belong to a same semantic class (e.g., the intersection 226). The neural network can classify such datapoints as belonging to an intersection (e.g., the intersection 226) and/or describing an intersection (e.g., the intersection 226), and can use such datapoints to determine the semantic meaning of the datapoints and/or the shape 530 of the intersection 226. Moreover, the neural network can determine that other datapoints (e.g., datapoints 534) that are farther in distance from the datapoints 532 associated with the intersection 226 correspond to a different semantic class or do not correspond to the semantic class (e.g., the intersection 226) of the datapoints 532 and/or belong to one or more other scene elements.

Moreover, the distribution of datapoints 542 and 544 can include datapoints 542 within a boundary of the shape 540 of the crosswalk 224 (e.g., along the boundary and/or inside of the boundary) and datapoints 544 outside of the boundary of the shape 540 of the crosswalk 224. The neural network can be trained to and can learn to use the datapoints 542 to determine the semantic meaning of the datapoints 542 (e.g., the crosswalk 224) and/or the semantic meaning of the shape 540 of the crosswalk 224 represented by the datapoints 542. For example, the neural network can be trained to and can learn to use the datapoints 542 within the boundary of the shape 540 of the crosswalk 224 to determine the semantic meaning of the datapoints 542 associated with the shape 540 and the crosswalk 224. In some examples, the neural network can also be trained to and can learn to recognize/determine that the datapoints 544 located outside of the boundary of the shape 540 of the crosswalk 224 do not belong to the same semantic class (e.g., the crosswalk 224) as the datapoints 542 and/or do not describe and/or represent any portion of the crosswalk 224.

In some examples, the neural network can determine which datapoints belong to (e.g., describe, represent, and/or correspond to) the crosswalk 224 (and/or an associated semantic meaning/class) and which datapoints do not belong to the crosswalk 224 (and/or an associated semantic meaning/class) based on respective distances between the datapoints and/or patterns in the datapoints. For example, the neural network can determine that datapoints (e.g., datapoints 542) that are closer in proximity to each other and/or are clustered closer together in space (e.g., within a threshold distance of each other) belong to the crosswalk 224 (and/or the semantic class associated with the crosswalk 224). The neural network can classify such datapoints as belonging to the crosswalk 224 and/or representing the crosswalk 224, and can use such datapoints to determine their semantic meaning. Moreover, the neural network can determine that other datapoints (e.g., datapoints 544) that are farther in distance from the datapoints 542 associated with the crosswalk 224 do not belong to the same semantic class (e.g., crosswalk 224) and/or belong to a different semantic class and/or one or more other scene elements.

The number and distribution of datapoints shown in FIG. 5B are merely illustrative examples provided for explanation purposes. In other examples, the number and/or distribution of datapoints associated with a scene element (e.g., the intersection 226 and/or the crosswalk 224) can vary from the numbers and/or distributions shown in FIG. 5B. Moreover, a neural network trained according to the systems and techniques described herein can learn to detect the semantic meaning of datapoints associated with the intersection 226 and/or the shape 530 of the intersection 226 based on more or less datapoints than the datapoints 532 associated with the intersection 226 in FIG. 5B. Similarly, a neural network trained according to the systems and techniques described herein can learn to detect the semantic meaning of the datapoints associated with the crosswalk 224 and/or the shape 540 of the crosswalk 224 based on more or less datapoints than the datapoints 542 associated with the crosswalk 224 in FIG. 5B.

Further, a neural network trained according to the systems and techniques described herein can learn the semantic meaning of datapoints inside the shape 530 of the intersection 226, along a boundary of the shape 530 of the intersection 226, and/or outside (e.g., within a proximity) the shape 530 of the intersection 226 (and/or any other shape and/or associated scene element) based a variety of distributions (e.g., randomized distributions as explained herein) of datapoints (e.g., the datapoints 532 associated with the intersection 226 and/or the shape 530 of the intersection 226). A neural network trained according to the systems and techniques described herein can also learn to detect the semantic meaning of datapoints (e.g., datapoints 542) that correspond to the crosswalk 224 and/or the shape 540 of the crosswalk 224 based on a variety of distributions of the datapoints (e.g., datapoints 542) associated with the crosswalk 224 and/or the shape 540 of the crosswalk 224.

Figure 5C:
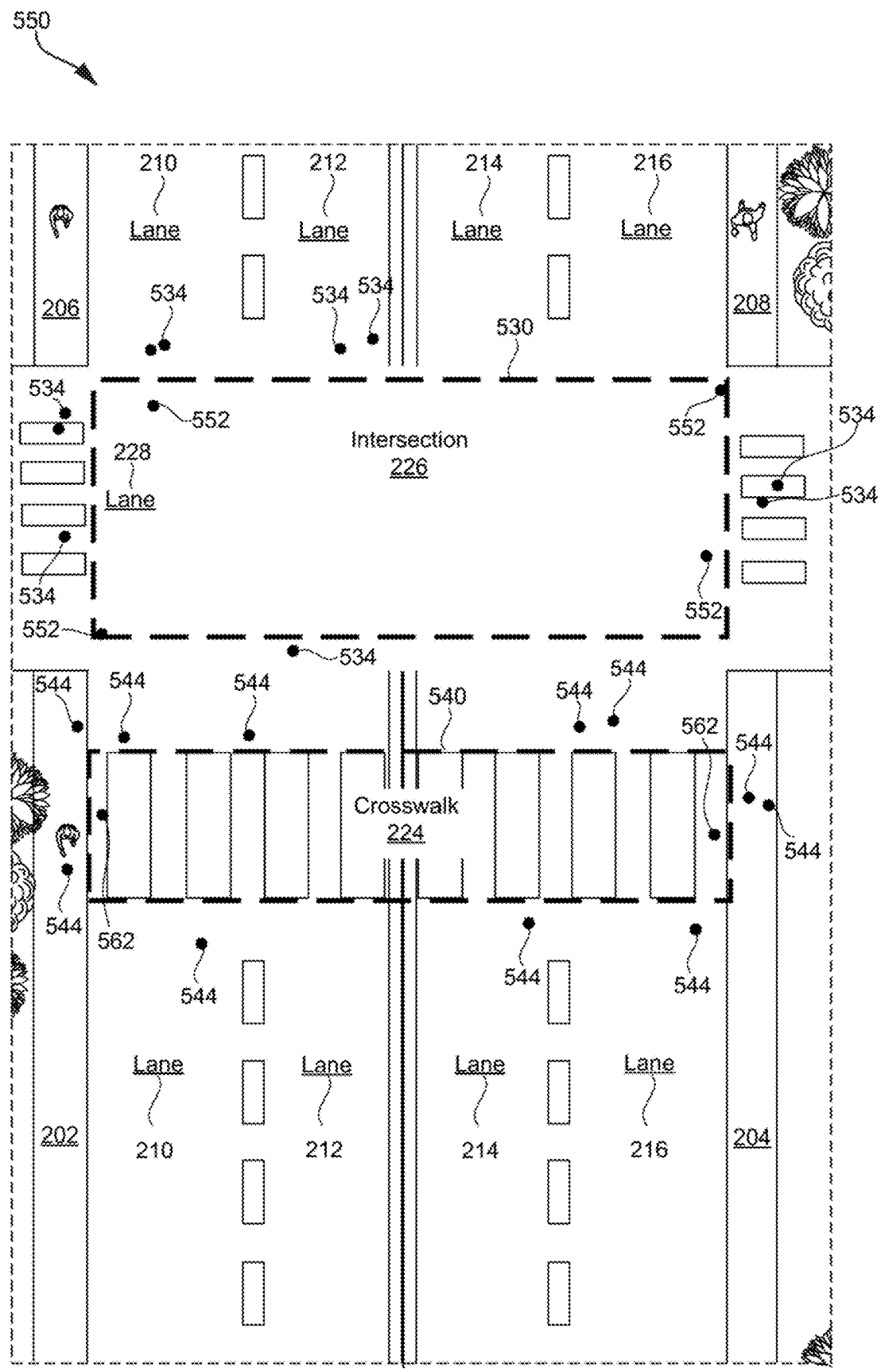

For example, with reference to FIG. 5C, which illustrates another example semantic map 550 of an AV scene (e.g., AV scene 200) with datapoints representing scene elements in the AV scene, a neural network trained according to the systems and techniques described herein can learn to determine the semantic meaning of datapoints (e.g., datapoints 552) corresponding to a scene element (e.g., intersection 226) and/or a shape of the scene element (e.g., shape 530) based the example distribution of datapoints 552 shown in FIG. 5C and/or any other distribution of datapoints corresponding to that scene element and/or the shape of that scene element.

In this example, the distribution of datapoints 552 includes four (4) datapoints, with one (1) datapoint along a boundary of the shape 530 of the intersection 226 and three (3) datapoints within an interior of the shape 530 of the intersection 226. The neural network can determine the semantic meaning of the datapoints 552 as previously described. For example, the neural network can determine that the four (4) datapoints, including the datapoint along a boundary of the shape 530 of the intersection 226 and the three (3) datapoints within an interior of the shape 530 of the intersection 226, correspond to an intersection. In other examples, the neural network can learn the semantic meaning of the datapoints 552 associated with the intersection 226 and/or the shape 530 of the intersection 226 based on a different number of datapoints and/or a different distribution/arrangement of datapoints associated with the intersection 226 and/or the shape 530 of the intersection 226. The neural network can determine the semantic meaning of the datapoints 552 without necessarily having to determine the shape 530 of the intersection 226 and/or one or more boundaries of the intersection 226.

Similarly, a neural network trained according to the systems and techniques described herein can learn to determine the semantic meaning of the datapoints 562 associated with the crosswalk 224 and/or the shape 540 of the crosswalk 224 based the example distribution of datapoints 562 shown in FIG. 5C and/or any other distribution of datapoints associated with the crosswalk 224 and/or the shape 540 of the crosswalk 224. In this example, the distribution of datapoints 562 includes two (2) datapoints within an interior of the shape 540 of the crosswalk 224. The neural network can determine the semantic meaning of the datapoints 562 based on this example distribution of datapoints 562. However, in other examples, the neural network can learn the semantic meaning of the of the datapoints 562 associated with the crosswalk 224 and/or the shape 540 of the crosswalk 224 based on a different number of datapoints and/or a different distribution/arrangement of datapoints associated with the crosswalk 224 and/or the shape 540 of the crosswalk 224. The neural network can determine the semantic meaning of the datapoints 562 without necessarily having to determine the shape 540 of the crosswalk 224 and/or one or more boundaries of the crosswalk 224.

In some examples, the neural network can be trained to detect the semantic meaning of the datapoints 552 associated with the intersection 226 and/or the shape 530 of the intersection 226 using different numbers of datapoints and/or different distributions of datapoints (e.g., datapoints contained within the shape 530 of the intersection 226, datapoints along a boundary of the shape 530 of the intersection 226, and/or datapoints within a proximity to the shape 530 of the intersection 226. This way, the neural network can learn to detect the semantic meaning of datapoints associated with a scene element, such as the intersection, based on their pattern/arrangement/distribution and/or location relative to a shape 530 of the scene element, and given any variation of the number and/or distribution of such datapoints, and can distinguish between, on one hand, the semantic meaning of the datapoints 552 associated with the intersection 226 and/or the shape 530 of the intersection 226, as well as any associated context in data (e.g., a set of datapoints) associated with the intersection 226 and, on the other hand, non-semantic and/or non-contextual differences in the data associated with the intersection 226 such as, for example, color variations, noise variations, size variations, visual distortions/variations, variations in pose, etc.

Moreover, in some examples, the neural network can be trained to detect the semantic meaning of the datapoints 544 associated with the crosswalk 224 and/or the shape 540 of the crosswalk 224 using different numbers of datapoints and/or different distributions of datapoints associated with the crosswalk 224 and/or the shape 540 of the crosswalk 224 (e.g., any number and/or distribution of datapoints along a boundary of the shape 540 of the crosswalk 224, within an interior of the shape 540 of the crosswalk 224, and/or within a proximity to the shape 540 of the crosswalk 224). This way, the neural network can learn to detect the semantic meaning of datapoints corresponding to a scene element (e.g., the crosswalk 224) and/or the shape (e.g., shape 540) of the scene element based on any variation of the number and/or distribution of datapoints associated with the crosswalk 224 and/or the shape 540 of the crosswalk 224, and can distinguish between, on one hand, the semantic meaning of the datapoints corresponding to the crosswalk 224 and/or the shape 540 of the crosswalk 224, as well as any associated context in data (e.g., a set of datapoints) associated with the crosswalk 224 and, on the other hand, non-semantic and/or non-contextual differences in the data associated with the crosswalk 224 such as, for example, color variations, noise variations, size variations, visual distortions/variations, variations in pose, etc. As previously mentioned, the neural network can determine the semantic meaning of datapoints associated with a scene element (e.g., crosswalk 224, intersection 226, etc.) without necessarily having to detect a shape (e.g., shape 530, shape 540) of the scene element and/or one or more boundaries of the shape of the scene element.

Figure 6:
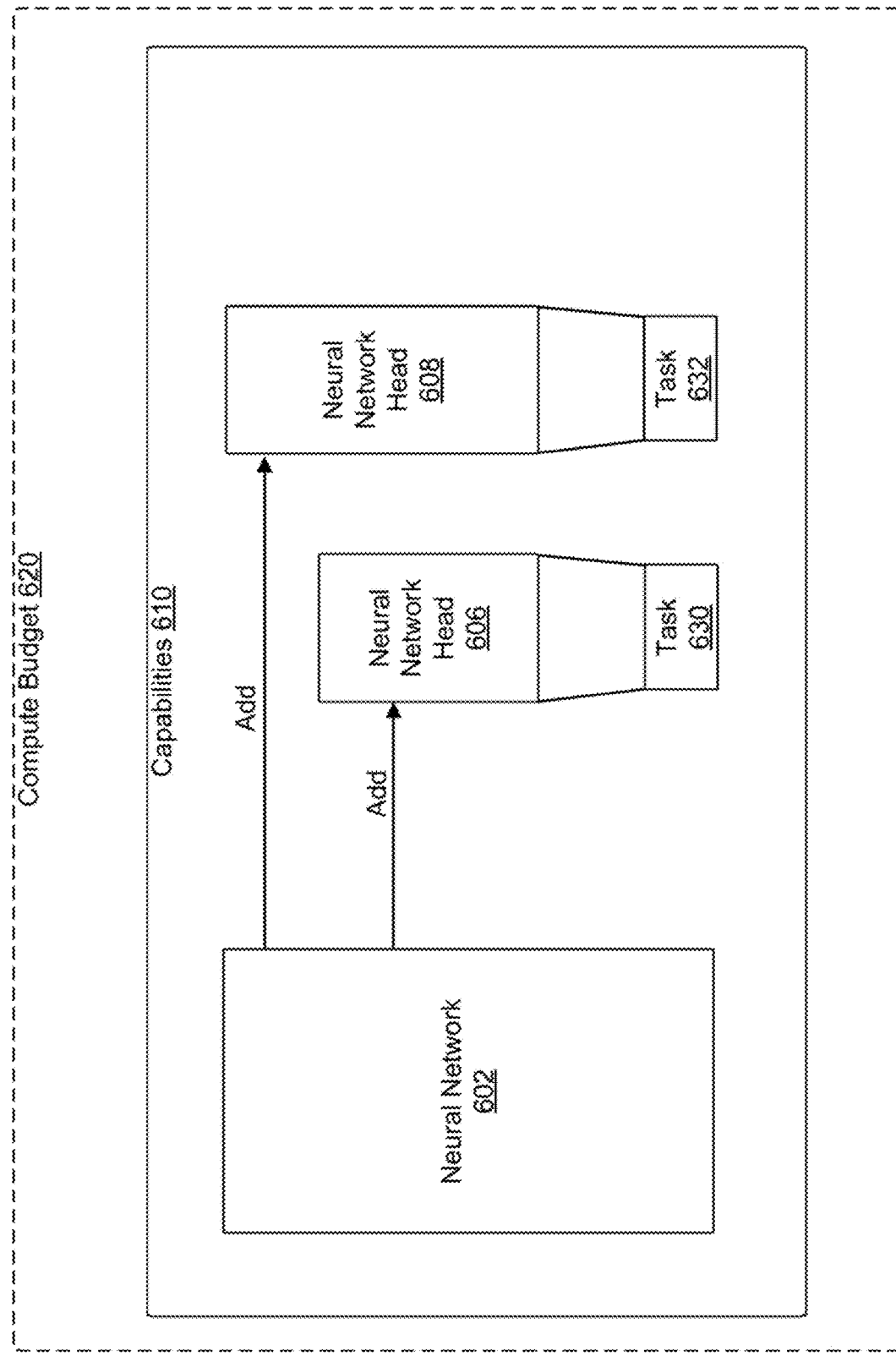
FIG. 6 is a diagram illustrating an example of a neural network head configured to extend/augment its capabilities without exceeding a compute budget associated with the neural network head, according to some examples of the present disclosure.

FIG. 6 is a diagram illustrating an example of a neural network 602 configured to extend/augment its capabilities without exceeding a compute budget 620 associated with the neural network 602. In this example, the neural network 602 can be configured to perform one or more tasks such as, for example and without limitation, a data processing task, a detection task, a classification task, a recognition task, a tracking task, a prediction task, and/or any other task(s). For example, the neural network 602 can be configured to predict a trajectory of scene agents (e.g., vehicles, pedestrians, bicycles, motorcycles, animals, and/or any other moving items), compute scene contextual right-of-way yields and assert probabilities, compute cost fields, track and/or predict agent interactions, detect scene elements (and associated shapes), classify scene elements, and/or any other task.

In some examples, the neural network 602 can be trained to make determinations of semantic meanings of datapoints corresponding to specific scene elements based on various numbers and/or distributions of the datapoints, as previously explained. Thus, the neural network 602 can be trained to be increasingly robust, accurate, and efficient. For example, the neural network 602 can learn to make predictions with lower numbers of datapoints. In some examples, the increased efficiency of the neural network 602 can allow the capabilities of the neural network 602 to be extended so the neural network 602 can perform additional tasks, such as task 630 and/or task 632, without exceeding it compute budget 620.

To extend the capabilities of the neural network 602, a neural network head can be added to the neural network 602 per each additional task and/or group of tasks. For example, to extend the capabilities of the neural network 602 to enable the neural network 602 to perform task 630, the neural network head 606 can be added to the neural network 602. The neural network head 606 can be configured and/or trained to perform the task 630. Similarly, to extend the capabilities of the neural network 602 to enable the neural network 602 to perform task 632, the neural network head 608 can be added to the neural network 602. The neural network head 608 can be configured and/or trained to perform the task 632. The task 630 and the task 632 can include any neural network task such as, for example and without limitation, a prediction task, a classification task, a data generation task, a data processing task, a recognition task, a tracking task, a detection task, and/or any other task.

In some examples, the compute budget 620 can define a number of datapoints that the neural network 602 can process and/or is allowed or configured to process to generate certain outputs (e.g., classifications, predictions, detections, etc.). Thus, by increasing the efficiency of the neural network 602 (e.g., how many datapoints the neural network 602 needs or relies on to generate an output), the neural network 602 can perform additional tasks (e.g., task 630 and/or task 632) without exceeding the compute budget 620 associated with the neural network 602. In other examples, the compute budget 620 can additionally or alternatively define an amount of compute resources that the neural network 602 can use, an amount of bandwidth that the neural network 602 can use, and/or any other compute budget.

Figure 7A:
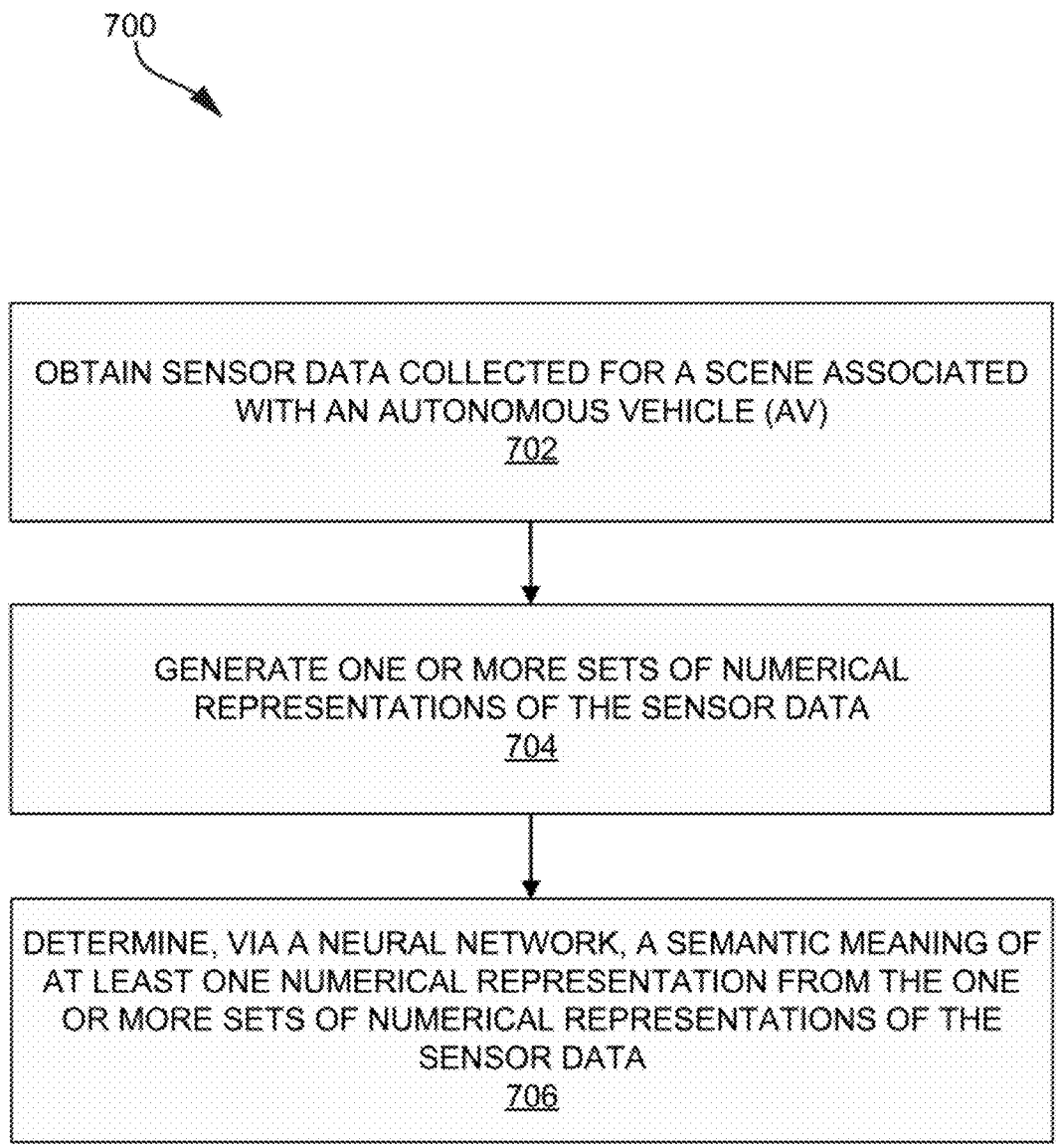
FIGS. 7A and 7B are flowcharts illustrating example processes for generating self-supervised neural networks and using pseudo-random sequences of traffic scenes for self-supervised training, according to some examples of the present disclosure.

FIG. 7A is a flowchart illustrating an example process 700 for generating self-supervised neural networks and using pseudo-random sequences of traffic scenes for self-supervised training. At block 702, the process 700 can include obtaining sensor data collected for a scene (e.g., traffic scene 200) associated with an AV (e.g., AV 102). In some examples, the sensor data can describe, measure, and/or depict one or more elements (e.g., sidewalk 202, sidewalk 204, sidewalk 206, sidewalk 208, lane 210, lane 212, lane 214, lane 216, crosswalk 224, intersection 226, lane 228, etc.) in the scene.

In some examples, the sensor data can include image data measuring, describing, and/or depicting the one or more elements in the scene.

At block 704, the process 700 can include generating one or more sets of numerical representations (e.g., input representations 304A-304N) of the sensor data. In some examples, each numerical representation from the one or more sets of numerical representations can represent at least one element of the one or more elements. For example, a numerical representation can represent a crosswalk in the scene, an intersection in the scene, a traffic lane in the scene, a sidewalk in the scene, an egress ramp in the scene, an ingress ramp in the scene, or any other scene element.

At block 706, the process 700 can include determining, via a neural network (e.g., neural network 306), a semantic meaning of at least one numerical representation from the one or more sets of numerical representations of the sensor data. The at least one numerical representation can correspond to the at least one element of the one or more elements. For example, the at least one numerical representation can represent (e.g., measure, describe, belong to, etc.) the at least one element in the scene. In some examples, the at least one numerical representation can include datapoints sampled from the scene and/or corresponding to the at least one element in the scene.

In some cases, the one or more sets of numerical representations of the sensor data can include different random or pseudo-random distributions of datapoints representing the one or more elements. In some aspects, the process 700 can include training the neural network to determine a respective semantic meaning of each numerical representation from the one or more sets of numerical representations of the sensor data; and modifying the neural network based on the training of the neural network. In some examples, training the neural network to determine the respective semantic meaning of each numerical representation from the one or more sets of numerical representations of the sensor data can include generating, generating, by the neural network based on the one or more sets of numerical representations, a plurality of embeddings that provides representations of the one or more sets of numerical representations of the sensor data; generating, by an additional neural network, a plurality of projections based on the plurality of embeddings; determining a loss based on a comparison of the plurality of projections; and modifying one or more parameters of the neural network based on the loss. In some examples, each projection projects a respective embedding from the plurality of embeddings into n-dimensional space. In some cases, the one or more parameters can include weights and/or activation functions.

In some aspects, the process 700 can include modifying the neural network based on the training of the neural network. For example, the process 700 can include modifying one or more weights used by the neural network based on the training of the neural network. In some cases, the neural network can include a neural network backbone. In other cases, the neural network can include a neural network head.

In some examples, the sensor data can include image data depicting the one or more elements in the scene. In some aspects, generating the one or more sets of numerical representations of the sensor data can include generating a plurality of different versions of the image data and, for each version of the image data from the plurality of different versions of the image data, generating a numerical representation of that version of the image data. In some examples, each version of the image data depicts the at least one element of the one or more elements. In some cases, each version of the image data can include one or more modifications to the image data. In some examples, the one or more modifications to the image data can include a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and/or adding to the image data an occlusion that blocks or conceals at least a portion of the at least one element depicted in the image data.

In some cases, the one or more sets of numerical representations of the sensor data can include different random or pseudo-random distributions of datapoints representing the one or more elements. In some aspects, the process 700 can include detecting the semantic meaning of one or more of the different random or pseudo-random distributions of datapoints representing the at least one element. In some examples, determining the semantic meaning of the at least one numerical representation corresponding to the at least one element can include determining a category/class associated with the at least one element.

In some aspects, the process 700 can include determining a respective semantic meaning of at least one numerical representation of additional sensor data corresponding to an element in a traffic scene based on the additional sensor data and/or the at least one numerical representation of the additional sensor data.

In some cases, the at least one element can include a traffic lane, a crosswalk, an intersection, a sidewalk, and/or a ramp connecting a first road to a second road.

Figure 7B:
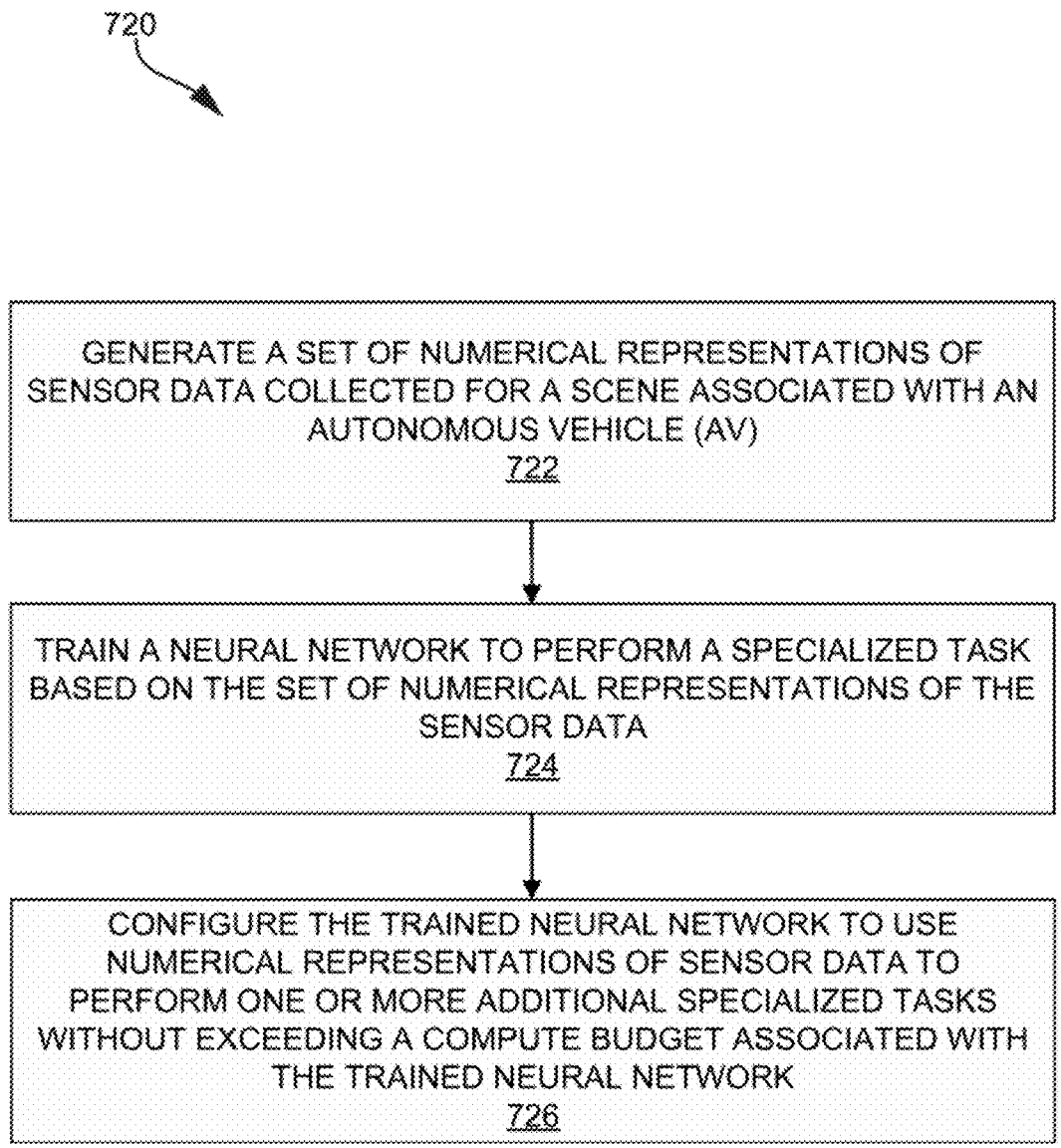

FIG. 7B is a flowchart illustrating another example process 720 for generating self-supervised neural networks and using pseudo-random sequences of traffic scenes for self-supervised training. At block 722, the process 720 can include generating a set of numerical representations of sensor data collected for a scene associated with an autonomous vehicle (AV). In some examples, the sensor data can describe, measure, and/or depict at least one element in the scene. In some cases, the at least one element can include a crosswalk, a traffic lane, a sidewalk, an intersection, and/or a ramp connecting a first road to a second road.

At block 724, the process 720 can include training a neural network to perform a specialized task based on the set of numerical representations of the sensor data. In some cases, each numerical representation of the set of numerical representations provides a representation of at least one element in the scene. In some examples, training the neural network to perform the specialized task can include training the neural network to determine one or more aspects of the at least one element based on the set of numerical representations of the sensor data. In some aspects, the one or more aspects of the at least one element can include a semantic meaning of the at least one element. In some cases, training the neural network to perform the specialized task can include training the neural network to determine a semantic meaning of each numerical representation from the set of numerical representations of the sensor data.

In some examples, the neural network can include a neural network head attached to a neural network backbone and configured to process an output of the neural network backbone.

At block 726, the process 720 can include configuring the trained neural network to use numerical representations of sensor data to perform one or more additional specialized tasks without exceeding a compute budget associated with the trained neural network. In some aspects, the one or more additional specialized tasks can include an object detection task, an object recognition task, an object tracking task, an object localization task, a prediction task, a classification task, and/or an AV task.

In some examples, the compute budget can include a maximum or total number of datapoints to be processed by the neural network, a bandwidth to be used by the neural network, and/or a maximum or total number of compute resources to be used by the neural network.

In some cases, the sensor data can include image data depicting the at least one element in the scene. In some aspects, generating the set of numerical representations of the sensor data can include generating a plurality of different versions of the image data; and for each version of the image data from the plurality of different versions of the image data, generating a numerical representation that provides a respective representation of that version of the image data. In some examples, each version of the image data depicts the at least one element, and each version of the image data includes one or more modifications to the image data. In some cases, the one or more modifications to the image data can include a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and/or adding to the image data an occlusion that blocks or conceals at least a portion of the at least one element depicted in the image data.

In some examples, the set of numerical representations of the sensor data can include different random or pseudo-random distributions of datapoints representing the at least one element of the one or more elements. In some cases, the specialized task can include detecting one or more aspects of the at least one element in the scene. In some aspects, the process 720 can include detecting a semantic meaning of the different random or pseudo-random distributions of datapoints representing the at least one element. In some examples, the one or more aspects of the at least one element can include a semantic meaning of the at least one element such as a scene element category/class associated with the at least one element.

In some aspects, training the neural network can include based on the set of numerical representations, generating, by the neural network, a plurality of embeddings (e.g., embeddings 322A-322N) that provides representations of the set of numerical representations; generating, by an additional neural network (e.g., neural network 324), a plurality of projections (e.g., projections 326A-326N) based on the plurality of embeddings; determining a loss based on a comparison of the plurality of projections; and modifying one or more parameters of the neural network based on the loss. In some examples, each projection projects a respective embedding from the plurality of embeddings into n-dimensional space. In some cases, the one or more parameters can include weights and/or activation functions.

FIG. 8 illustrates an example processor-based system with which some aspects of the subject technology can be implemented. For example, processor-based system 800 can be any computing device making up local computing device 110, remote computing system 190, a passenger device (e.g., client computing device 180) executing the ridesharing application 182, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some aspects, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, and/or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 can include an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 830 can include software services, servers, services, etc., that when the code that defines such software is executed by the processor 810, causes the system to perform a function. In some examples, a hardware service that performs a particular function can include the software component stored in a computer-readable medium in connection with the necessary hardware components, such as processor 810, connection 805, output device 835, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments.

Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: memory; and one or more processors coupled to the memory, the one or more processors being configured to: generate a set of numerical representations of sensor data collected for a scene associated with an autonomous vehicle (AV); train a neural network to perform a specialized task based on the set of numerical representations of the sensor data; and configure the trained neural network to use numerical representations of sensor data to perform one or more additional specialized tasks without exceeding a compute budget associated with the trained neural network.

Aspect 2. The system of Aspect 1, wherein each numerical representation of the set of numerical representations provides a representation of at least one element in the scene, and wherein training the neural network to perform the specialized task comprises training the neural network to determine one or more aspects of the at least one element based on the set of numerical representations of the sensor data.

Aspect 3. The system of Aspect 1 or 2, wherein the at least one element comprises at least one of a crosswalk, a traffic lane, a sidewalk, an intersection, and a ramp connecting a first road to a second road.

Aspect 4. The system of any of Aspects 1 to 3, wherein the neural network comprises a neural network head attached to a neural network backbone and configured to process an output of the neural network backbone.

Aspect 5. The system of any of Aspects 1 to 5, wherein the one or more additional specialized tasks comprise at least one of an object detection task, an object recognition task, an object tracking task, an object localization task, a prediction task, a classification task, and an AV task.

Aspect 6. The system of any of Aspects 1 to 5, wherein the sensor data comprises image data depicting the at least one element in the scene, and wherein generating the set of numerical representations of the sensor data comprises: generating a plurality of different versions of the image data, wherein each version of the image data depicts the at least one element, and wherein each version of the image data comprises one or more modifications to the image data; and for each version of the image data from the plurality of different versions of the image data, generating a numerical representation that provides a respective representation of that version of the image data.

Aspect 7. The system of Aspect 6, wherein the one or more modifications to the image data comprise at least one of a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and adding to the image data an occlusion that blocks or conceals at least a portion of the at least one element depicted in the image data.

Aspect 8. The system of any of Aspects 1 to 7, wherein the set of numerical representations of the sensor data comprises different random or pseudo-random distributions of datapoints representing the at least one element of the one or more elements.

Aspect 9. The system of Aspect 8, wherein the specialized task comprises detecting one or more aspects of the at least one element in the scene.

Aspect 10. The system of Aspect 9, wherein the one or more processors are configured to: detect a shape of the at least one element based on the different random or pseudo-random distributions of datapoints representing the at least one element; and identify the at least one element based on the detected shape of the at least one element, wherein the one or more aspects of the at least one element comprise at least one of the shape of the at least one element and a scene element category associated with the at least one element.

Aspect 11. The system of any of Aspects 1 to 10, wherein training the neural network comprises: based on the set of numerical representations, generating, by the neural network, a plurality of embeddings that provides representations of the set of numerical representations; generating, by an additional neural network, a plurality of projections based on the plurality of embeddings, wherein each projection projects a respective embedding from the plurality of embeddings into n-dimensional space; determining a loss based on a comparison of the plurality of projections; and modifying one or more parameters of the neural network based on the loss, the one or more parameters comprising at least one of weights and activation functions.

Aspect 12. The system of any of Aspects 1 to 11, wherein the compute budget comprises at least one of a maximum number of datapoints to be processed by the neural network, a bandwidth to be used by the neural network, and a maximum number of compute resources to be used by the neural network.

Aspect 13. A method comprising: generating a set of numerical representations of sensor data collected for a scene associated with an autonomous vehicle (AV); training a neural network to perform a specialized task based on the set of numerical representations of the sensor data; and configuring the trained neural network to use numerical representations of sensor data to perform one or more additional specialized tasks without exceeding a compute budget associated with the trained neural network.

Aspect 14. The method of Aspect 13, wherein each numerical representation of the set of numerical representations provides a representation of at least one element in the scene, and wherein training the neural network to perform the specialized task comprises training the neural network to determine one or more aspects of the at least one element based on the set of numerical representations of the sensor data.

Aspect 15. The method of Aspect 13 or 14, wherein the at least one element comprises at least one of a crosswalk, a traffic lane, a sidewalk, an intersection, and a ramp connecting a first road to a second road.

Aspect 16. The method of any of Aspects 13 to 15, wherein the neural network comprises a neural network head attached to a neural network backbone and configured to process an output of the neural network backbone.

Aspect 17. The method of any of Aspects 13 to 16, wherein the one or more additional specialized tasks comprise at least one of an object detection task, an object recognition task, an object tracking task, an object localization task, a prediction task, a classification task, and an AV task.

Aspect 18. The method of any of Aspects 13 to 17, wherein the sensor data comprises image data depicting the at least one element in the scene, and wherein generating the set of numerical representations of the sensor data comprises: generating a plurality of different versions of the image data, wherein each version of the image data depicts the at least one element, and wherein each version of the image data comprises one or more modifications to the image data; and for each version of the image data from the plurality of different versions of the image data, generating a numerical representation that provides a respective representation of that version of the image data.

Aspect 19. The method of Aspect 18, wherein the one or more modifications to the image data comprise at least one of a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and adding to the image data an occlusion that blocks or conceals at least a portion of the at least one element depicted in the image data.

Aspect 20. The method of any of Aspects 13 to 19, wherein the set of numerical representations of the sensor data comprises different random or pseudo-random distributions of datapoints representing the at least one element of the one or more elements.

Aspect 21. The method of Aspect 20, wherein the specialized task comprises detecting one or more aspects of the at least one element in the scene.

Aspect 22. The method of Aspect 21, further comprising: detecting a shape of the at least one element based on the different random or pseudo-random distributions of datapoints representing the at least one element; and identifying the at least one element based on the detected shape of the at least one element, wherein the one or more aspects of the at least one element comprise at least one of the shape of the at least one element and a scene element category associated with the at least one element.

Aspect 23. The method of any of Aspects 13 to 22, wherein training the neural network comprises: based on the set of numerical representations, generating, by the neural network, a plurality of embeddings that provides representations of the set of numerical representations; generating, by an additional neural network, a plurality of projections based on the plurality of embeddings, wherein each projection projects a respective embedding from the plurality of embeddings into n-dimensional space; determine a loss based on a comparison of the plurality of projections; and modifying one or more parameters of the neural network based on the loss, the one or more parameters comprising at least one of weights and activation functions.

Aspect 24. The method of any of Aspects 13 to 23, wherein the compute budget comprises at least one of a maximum number of datapoints to be processed by the neural network, a bandwidth to be used by the neural network, and a maximum number of compute resources to be used by the neural network.

Aspect 25. A non-transitory computer-readable medium having stored thereon instructions which, when executed by one or more processors, cause the one or more processors to perform a method according to any of Aspects 13 to 24.

Aspect 26. A computer-program product having stored thereon instructions which, when executed by one or more processors, cause the one or more processors to perform a method according to any of Aspects 13 to 24.

Aspect 27. A system comprising means for performing a method according to any of Aspects 13 to 24.

Aspect 28. The system of Aspect 27, wherein the system comprises the AV.

Aspect 29. The system of any of Aspects 27 or 28, wherein the system comprises an autonomous vehicle computer.

Aspect 30. A system comprising: a memory; and one or more processors coupled to the memory, the one or more processors being configured to: obtain sensor data collected for a scene associated with an autonomous vehicle (AV), the sensor data describing, measuring, or depicting one or more elements in the scene; generate one or more sets of numerical representations of the sensor data, wherein each numerical representation from the one or more sets of numerical representations represents at least one element of the one or more elements; and determine, via a neural network, a semantic meaning of at least one numerical representation from the one or more sets of numerical representations of the sensor data, the at least one numerical representation corresponding to the at least one element of the one or more elements.

Aspect 31. The system of Aspect 30, wherein the sensor data comprises image data depicting the one or more elements in the scene.

Aspect 32. The system of Aspect 31, wherein generating the one or more sets of numerical representations of the sensor data comprises: generating a plurality of different versions of the image data, wherein each version of the image data depicts the at least one element of the one or more elements, and wherein each version of the image data comprises one or more modifications to the image data; and for each version of the image data from the plurality of different versions of the image data, generating a numerical representation of that version of the image data.

Aspect 33. The system of Aspect 32, wherein the one or more modifications to the image data comprise at least one of a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and adding to the image data an occlusion that blocks or conceals at least a portion of the at least one element depicted in the image data.

Aspect 34. The system of any of Aspects 30 to 33, wherein the one or more sets of numerical representations of the sensor data comprise different random or pseudo-random distributions of datapoints representing the one or more elements.

Aspect 35. The system of Aspect 34, wherein the one or more processors are configured to: train the neural network to determine a respective semantic meaning of each numerical representation from the one or more sets of numerical representations of the sensor data; and modify the neural network based on the training of the neural network.

Aspect 36. The system of Aspect 35, wherein training the neural network to determine the respective semantic meaning of each numerical representation comprises: based on the one or more sets of numerical representations, generating, by the neural network, a plurality of embeddings that provides representations of the one or more sets of numerical representations of the sensor data; generating, by an additional neural network, a plurality of projections based on the plurality of embeddings, wherein each projection projects a respective embedding from the plurality of embeddings into n-dimensional space; determining a loss based on a comparison of the plurality of projections; and modifying one or more parameters of the neural network based on the loss, the one or more parameters comprising at least one of weights and activation functions.

Aspect 37. The system of any of Aspects 30 to 36, wherein the one or more processors are configured to: determine a respective semantic meaning of at least one numerical representation of additional sensor data corresponding to an element in a traffic scene based on at least one of the additional sensor data and the at least one numerical representation of the additional sensor data.

Aspect 38. The system of any of Aspects 30 to 37, wherein the at least one element comprises at least one of a traffic lane, a crosswalk, an intersection, a sidewalk, and a ramp connecting a first road to a second road.

Aspect 39. A method comprising: obtaining sensor data collected for a scene associated with an autonomous vehicle (AV), the sensor data describing, measuring, or depicting one or more elements in the scene; generating one or more sets of numerical representations of the sensor data, wherein each numerical representation from the one or more sets of numerical representations represents at least one element of the one or more elements; and determining, via a neural network, a semantic meaning of at least one numerical representation from the one or more sets of numerical representations of the sensor data, the at least one numerical representation corresponding to the at least one element of the one or more elements.

Aspect 40. The method of Aspect 39, wherein the sensor data comprises image data depicting the one or more elements in the scene.

Aspect 41. The method of Aspect 40, wherein generating the one or more sets of numerical representations of the sensor data comprises: generating a plurality of different versions of the image data, wherein each version of the image data depicts the at least one element of the one or more elements, and wherein each version of the image data comprises one or more modifications to the image data; and for each version of the image data from the plurality of different versions of the image data, generating a numerical representation of that version of the image data.

Aspect 42. The method of Aspect 41, wherein the one or more modifications to the image data comprise at least one of a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and adding to the image data an occlusion that blocks or conceals at least a portion of the at least one element depicted in the image data.

Aspect 43. The method of any of Aspects 39 to 42, wherein the one or more sets of numerical representations of the sensor data comprise different random or pseudo-random distributions of datapoints representing the one or more elements.

Aspect 44. The method of Aspect 43, further comprising: training the neural network to determine a respective semantic meaning of each numerical representation from the one or more sets of numerical representations of the sensor data; and modifying the neural network based on the training of the neural network.

Aspect 45. The method of Aspect 44, wherein training the neural network to determine the respective semantic meaning of each numerical representation comprises: based on the one or more sets of numerical representations, generating, by the neural network, a plurality of embeddings that provides representations of the one or more sets of numerical representations of the sensor data; generating, by an additional neural network, a plurality of projections based on the plurality of embeddings, wherein each projection projects a respective embedding from the plurality of embeddings into n-dimensional space; determine a loss based on a comparison of the plurality of projections; and modifying one or more parameters of the neural network based on the loss, the one or more parameters comprising at least one of weights and activation functions.

Aspect 46. The method of any of Aspects 39 to 45, further comprising: determining a respective semantic meaning of at least one numerical representation of additional sensor data corresponding to an element in a traffic scene based on at least one of the additional sensor data and the at least one numerical representation of the additional sensor data.

Aspect 47. The method of any of Aspects 39 to 46, wherein the at least one element comprises at least one of a traffic lane, a crosswalk, an intersection, a sidewalk, and a ramp connecting a first road to a second road.

Aspect 48. A non-transitory computer-readable medium having stored thereon instructions which, when executed by one or more processors, cause the one or more processors to perform a method according to any of Aspects 39 to 47.

Aspect 49. A system comprising means for performing a method according to any of Aspects 39 to 47.

Aspect 50. An autonomous vehicle comprising a computing device configured to perform a method according to any of Aspects 39 to 47.

What is claimed is:

1. A system comprising:
   a memory; and
   one or more processors coupled to the memory, the one or more processors being configured to:
   obtain sensor data collected for a scene associated with an autonomous vehicle (AV), the sensor data describing, measuring, or depicting one or more elements in the scene;
   generate one or more sets of numerical representations of the sensor data, wherein each numerical representation from the one or more sets of numerical representations represents at least one element of the one or more elements;
   determine, via a neural network, a semantic meaning of at least one numerical representation from the one or more sets of numerical representations of the sensor data, the at least one numerical representation corresponding to the at least one element of the one or more elements; and
   train the neural network to determine a respective semantic meaning of each numerical representation from the one or more sets of numerical representations of the sensor data, wherein training the neural network to determine the respective semantic meaning of each numerical representation comprises:
      based on the one or more sets of numerical representations, generating, by the neural network, a plurality of embeddings that provides representations of the one or more sets of numerical representations of the sensor data;
      generating, by an additional neural network, a plurality of projections based on the plurality of embeddings, wherein each projection projects a respective embedding from the plurality of embeddings into n-dimensional space;
      determining a loss based on a comparison of the plurality of projections; and
      modifying one or more parameters of the neural network based on the loss, the one or more parameters comprising at least one of weights and activation functions.

2. The system of claim 1, wherein the sensor data comprises image data depicting the one or more elements in the scene.

3. The system of claim 2, wherein generating the one or more sets of numerical representations of the sensor data comprises:
   generating a plurality of different versions of the image data, wherein each version of the image data depicts the at least one element of the one or more elements, and wherein each version of the image data comprises one or more modifications to the image data; and
   for each version of the image data from the plurality of different versions of the image data, generating a numerical representation of that version of the image data.

4. The system of claim 3, wherein the one or more modifications to the image data comprise at least one of a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and adding to the image data an occlusion that blocks or conceals at least a portion of the at least one element depicted in the image data.

5. The system of claim 1, wherein the one or more sets of numerical representations of the sensor data comprise different random or pseudo-random distributions of datapoints representing the one or more elements.

6. The system of claim 5, wherein the one or more processors are configured to
modify the neural network based on the training of the neural network.

7. The system of claim 1, wherein the one or more processors are configured to:
determine a respective semantic meaning of at least one numerical representation of additional sensor data corresponding to an element in a traffic scene based on at least one of the additional sensor data and the at least one numerical representation of the additional sensor data.

8. The system of claim 1, wherein the at least one element comprises at least one of a traffic lane, a crosswalk, an intersection, a sidewalk, and a ramp connecting a first road to a second road.

9. A method comprising:
obtaining sensor data collected for a scene associated with an autonomous vehicle (AV), the sensor data describing, measuring, or depicting one or more elements in the scene;
generating one or more sets of numerical representations of the sensor data, wherein each numerical representation from the one or more sets of numerical representations represents at least one element of the one or more elements;
determining, via a neural network, a semantic meaning of at least one numerical representation from the one or more sets of numerical representations of the sensor data, the at least one numerical representation corresponding to the at least one element of the one or more elements; and
training the neural network to determine a respective semantic meaning of each numerical representation from the one or more sets of numerical representations of the sensor data, wherein training the neural network to determine the respective semantic meaning of each numerical representation comprises:
based on the one or more sets of numerical representations, generating, by the neural network, a plurality of embeddings that provides representations of the one or more sets of numerical representations of the sensor data;
generating, by an additional neural network, a plurality of projections based on the plurality of embeddings, wherein each projection projects a respective embedding from the plurality of embeddings into n-dimensional space;
determining a loss based on a comparison of the plurality of projections; and
modifying one or more parameters of the neural network based on the loss, the one or more parameters comprising at least one of weights and activation functions.

10. The method of claim 9, wherein the sensor data comprises image data depicting the one or more elements in the scene.

11. The method of claim 10, wherein generating the one or more sets of numerical representations of the sensor data comprises:
generating a plurality of different versions of the image data, wherein each version of the image data depicts the at least one element of the one or more elements, and wherein each version of the image data comprises one or more modifications to the image data; and
for each version of the image data from the plurality of different versions of the image data, generating a numerical representation of that version of the image data.

12. The method of claim 11, wherein the one or more modifications to the image data comprise at least one of a cropping of the image data, a resizing of the image data, a color distortion applied to the image data, noise added to the image data, Sobel filtering applied to the image data, blurring of at least a portion of the image data, rotating the at least one element depicted in the image data, flipping the at least one element depicted in the image data, and adding to the image data an occlusion that blocks or conceals at least a portion of the at least one element depicted in the image data.

13. The method of claim 9, wherein the one or more sets of numerical representations of the sensor data comprise different random or pseudo-random distributions of datapoints representing the one or more elements.

14. The method of claim 13, further comprising
modifying the neural network based on the training of the neural network.

15. The method of claim 9, further comprising:
determining a respective semantic meaning of at least one numerical representation of additional sensor data corresponding to an element in a traffic scene based on at least one of the additional sensor data and the at least one numerical representation of the additional sensor data.

16. The method of claim 9, wherein the at least one element comprises at least one of a traffic lane, a crosswalk, an intersection, a sidewalk, and a ramp connecting a first road to a second road.

17. A non-transitory computer-readable medium having stored thereon instructions which, when executed by one or more processors, cause the one or more processors to:
obtain sensor data collected for a scene associated with an autonomous vehicle (AV), the sensor data describing, measuring, or depicting one or more elements in the scene;
generate one or more sets of numerical representations of the sensor data, wherein each numerical representation from the one or more sets of numerical representations represents at least one element of the one or more elements;
determine, via a neural network, a semantic meaning of at least one numerical representation from the one or more sets of numerical representations of the sensor data, the at least one numerical representation corresponding to the at least one element of the one or more elements; and
train the neural network to determine a respective semantic meaning of each numerical representation from the one or more sets of numerical representations of the sensor data, wherein training the neural network to determine the respective semantic meaning of each numerical representation comprises:

based on the one or more sets of numerical representations, generating, by the neural network, a plurality of embeddings that provides representations of the one or more sets of numerical representations of the sensor data;

generating, by an additional neural network, a plurality of projections based on the plurality of embeddings, wherein each projection projects a respective embedding from the plurality of embeddings into n-dimensional space;

determining a loss based on a comparison of the plurality of projections; and modifying one or more parameters of the neural network based on the loss, the one or more parameters comprising at least one of weights and activation functions.

18. The non-transitory computer-readable medium of claim 17, wherein generating the one or more sets of numerical representations of the sensor data comprises:

generating a plurality of different versions of the image data, wherein each version of the image data depicts the at least one element of the one or more elements, and wherein each version of the image data comprises one or more modifications to the image data; and for each version of the image data from the plurality of different versions of the image data, generating a numerical representation of that version of the image data.

* * * * *